US010681086B2

(12) United States Patent
Rodrigues De Moura Leitao et al.

(10) Patent No.: US 10,681,086 B2
(45) Date of Patent: Jun. 9, 2020

(54) METHODS, DEVICES AND COMPUTER PROGRAMS FOR SUBJECTING TRAFFIC ASSOCIATED WITH A SERVICE TO A SPECIFIC TREATMENT

(71) Applicant: Telefonaktiebolaget LM Ericsson (publ), Stockholm (SE)

(72) Inventors: Filipe Alexandre Rodrigues De Moura Leitao, Heidelberg (DE); Victor Ferraro Esparza, Valencia (ES); Fuencisla Garcia Azorero, Madrid (ES); Jonas Hogberg, Algete (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 207 days.

(21) Appl. No.: 15/124,084

(22) PCT Filed: Mar. 11, 2014

(86) PCT No.: PCT/EP2014/054671
§ 371 (c)(1),
(2) Date: Sep. 7, 2016

(87) PCT Pub. No.: WO2015/135572
PCT Pub. Date: Sep. 17, 2015

(65) Prior Publication Data
US 2017/0019424 A1 Jan. 19, 2017

(51) Int. Cl.
*H04L 12/06* (2006.01)
*H04L 29/06* (2006.01)
(Continued)

(52) U.S. Cl.
CPC .......... *H04L 63/20* (2013.01); *H04L 41/0893* (2013.01); *H04L 63/08* (2013.01);
(Continued)

(58) Field of Classification Search
CPC ........ H04W 12/06; G06F 21/31; H04L 63/08; H04L 63/20
(Continued)

(56) References Cited

U.S. PATENT DOCUMENTS

2003/0084170 A1* 5/2003 de Jong .............. H04L 63/0407
709/229
2007/0274522 A1* 11/2007 Boman .................. H04L 63/08
380/247
(Continued)

FOREIGN PATENT DOCUMENTS

WO    WO 2009/080106    7/2009

OTHER PUBLICATIONS

3GPP TS 29.214 v12.2.0; Technical Specification; 3rd Generation Partnership Project; Technical Specification Group Core Network and Terminals; Policy and Charging Control over Rx reference point (Release 12)—Dec. 2013.
(Continued)

*Primary Examiner* — David J Pearson
(74) *Attorney, Agent, or Firm* — Baker Botts, LLP

(57) ABSTRACT

A method aims at providing a service in a communication network, and comprises the following steps. An access to a service requiring authentication is initiated by a UE (100), An identity management node (300) authenticates the UE, and then sends, to a PCRF node (400), a message comprising: service information for identifying the service to which access is initiated, identification information for identifying the UE, and authentication information determined upon authenticating the UE. The PCRF node determines control rules to be applied to the service for the UE, based on the authentication information and service information. The PCRF node then triggers installation of the control rules in at least one network node (500) handling service data flows
(Continued)

(SDF) for the service, to enforce the control rules on traffic associated with the service for the UE. The invention also relates to devices and computer programs for carrying such as method.

20 Claims, 15 Drawing Sheets

(51) Int. Cl.
  *H04L 12/24* (2006.01)
  *H04M 15/00* (2006.01)
  *H04W 12/06* (2009.01)
(52) U.S. Cl.
  CPC ........ *H04L 63/083* (2013.01); *H04L 63/0823* (2013.01); *H04L 63/0853* (2013.01); *H04L 63/0861* (2013.01); *H04M 15/66* (2013.01); *H04W 12/06* (2013.01)
(58) Field of Classification Search
  USPC ............................................................ 726/1
  See application file for complete search history.

(56) References Cited

U.S. PATENT DOCUMENTS

| | | | |
|---|---|---|---|
| 2007/0286393 A1* | 12/2007 | Roever | H04L 12/2856 379/221.1 |
| 2008/0263631 A1* | 10/2008 | Wang | H04L 63/08 726/2 |
| 2010/0287599 A1 | 11/2010 | He et al. | |
| 2011/0173678 A1* | 7/2011 | Kaippallimalil | G06F 21/31 726/4 |
| 2011/0296489 A1* | 12/2011 | Fernandez Alonso | H04L 63/08 726/1 |
| 2012/0005356 A1* | 1/2012 | Hellgren | H04L 63/20 709/229 |
| 2012/0100849 A1* | 4/2012 | Marsico | H04W 28/24 455/432.1 |
| 2012/0196566 A1* | 8/2012 | Lee | H04M 15/80 455/408 |
| 2013/0083653 A1 | 4/2013 | Jain et al. | |
| 2013/0227120 A1* | 8/2013 | Yu | H04W 24/00 709/224 |
| 2013/0269020 A1* | 10/2013 | Griffin | H04L 63/0884 726/9 |
| 2013/0288668 A1* | 10/2013 | Pragada | H04W 8/005 455/426.1 |
| 2014/0086151 A1* | 3/2014 | Damola | H04W 28/16 370/328 |
| 2017/0078927 A1* | 3/2017 | Hahn | H04W 40/36 |

OTHER PUBLICATIONS

AT&T Introduces Sponsored Data for Mobile Data Subscribers and Businesses; Las Vegas, Nevada—Jan. 6, 2014.
3GPP TS 29.213 v12.2.0; Technical Specification; 3rd Generation Partnership Project; Technical Specification Group Core Network and Terminals; Policy and Charging Control signalling flows and Quality of Service (QoS) parameter mapping (Release 12)—Dec. 2013.
3GPP TS 23.203 v12.3.0; Technical Specification; 3rd Generation Partnership Project; Technical Specification Group Services and System Aspects; Policy and charging control architecture (Release 12)—Dec. 2013.
PCT Notification of Transmittal of the International Search Report and the Written Opinion of the International Searching Authority, or the Declaration for International application No. PCT/EP2014/054671—dated May 21, 2014.

* cited by examiner

METHODS, DEVICES AND COMPUTER PROGRAMS FOR SUBJECTING TRAFFIC ASSOCIATED WITH A SERVICE TO A SPECIFIC TREATMENT

PRIORITY

This nonprovisional application is a U.S. National Stage Filing under 35 U.S.C. § 371 of International Patent Application Serial No. PCT/EP2014/054671, filed Mar. 11, 2014, and entitled "Methods, Devices And Computer Programs For Subjecting Traffic Associated With A Service To A Specific Treatment."

TECHNICAL FIELD

The present invention relates to methods, devices and computer programs for providing a service in a communication network and for enforcing control rules on traffic associated with a service for a user equipment (UE). The invention notably relates to Internet Protocol (IP) traffic detection and classification, and to doing so for providing a special treatment, e.g. a specific packet-forwarding treatment.

BACKGROUND

In communication networks, such as telecommunication networks, a call or a service often involves, on the one hand, a control plane or signalling plane and, on the other hand, a user plane or media plane. The control plane or signalling plane is concerned with connection management. The user plane or media plane is mainly in charge of transporting the user data.

In this context, network operators often want to define and enforce a set of rules in the network. A set of rules constitutes policies. A policy framework for managing and enforcing these policies usually includes at least three elements, or functions: a policy repository for storing the policy rules, which may be user-specific, a policy decision element, function or point, and a policy enforcement element, function or point. The purposes of a policy framework include controlling subscriber access to the networks and services.

A policy framework notably addresses the decisions as to whether the subscriber, i.e. the user, is entitled, or authorized, to enjoy a service, and whether the network can provide the service to the subscriber (and, possibly, with which quality of service).

Policy and charging control (PCC) architectures, such as, but not limited to, the architecture described in "3GPP TS 23.203 V12.3.0 (2013-12); Technical Specification; 3rd Generation Partnership Project; Technical Specification Group Services and System Aspects; Policy and charging control architecture (Release 12)" (available from http://www.3gpp.org/ftp/Specs/html-info/23203.htm) (hereinafter referred to as reference [1]), integrate the policy and charging control.

In such a PCC architecture, the policy and charging rules function (PCRF) is a functional entity in charge of deciding charging, policies and quality of service (QoS) for services of a given user. The PCRF may for example decide the quality of the connection to be allocated for voice, video, etc., which results, for example, on the establishment of dedicated bearer(s) with guaranteed bit rate (GBR) or non-guaranteed bit rate (non GBR). The PCRF may also make decisions about packet forwarding treatment in the radio access network (RAN) by means of determining the QoS class identifier (QCI). The PCRF may also decide, at the packet core control plane, the priority of a bearer to be established over other bearers, for the same or different users. Based on the above decisions by the PCRF, control rules may be generated and then installed in a policy and charging enforcement function (PCEF) and a traffic detection function (TDF) of the PCC architecture, so that each service is given the appropriate treatment that the service requires. In particular, the control rules installed in the PCEF are the so-called PCC rules, whereas the control rules installed in the TDF are the so-called application detection and control (ADC) rules. Installing PCC rules from the PCRF in the PCEF may include the PCRF generating the PCC rules, downloading and activating said PCC rules to the PCEF, or may include activating, from the PCRF, indicated PCC rules configured in the PCEF. Likewise, installing ADC rules from the PORE in the TDF may include the PCRF generating the ADC rules, downloading and activating said ADC rules to the TDF. Notwithstanding this, where a PCEF is enriched with TDF capabilities, such PCEF only handles PCC rules, and at least some of these PCC rules may include ADC rules information usable by the TDF capabilities.

It is desirable to improve PCC architectures and similar architectures, notably by facilitating the provisions of services to users, taking into account the requirements associated with specific situations. This should preferably be achieved without increasing, or at least without excessively increasing, the implementation and architecture complexity and the associated equipment costs. It is also desirable for network operators to be able to reliably provide services and service components to users, while taking into account the potential need to subject the traffic associated with a service or a service component to a special treatment, such as for example special contents delivery.

SUMMARY

To meet or at least partially meet the above-mentioned goals, methods and network nodes according to the invention are defined in the independent claims. Particular embodiments are defined in the dependent claims.

In one embodiment, a method is aimed at providing a service in a communication network, and comprises the following steps. An access to a service requiring authentication is initiated by a UE. A network node, hereinafter referred to as "identity management node", authenticates the UE. The identity management node then sends, to a network node hosting a PCRF, said network node being hereinafter referred to as "PCRF node", a message comprising: (i) service information for identifying the service to which access is initiated, (ii) identification information for identifying the UE, and (iii) authentication information determined upon authenticating the UE. The PCRF node determines control rules to be applied to the service for the UE, based on the authentication information and service information. The PCRF node then triggers installation of the determined control rules in at least one network node handling service data flows (SDF) for the service, said at least one network node being hereinafter referred to as "SDF node(s)". The SDF node(s) then enforce(s) the control rules on traffic associated with the service provided to the UE.

The method enables control rules to be determined at the PCRF by taking authentication information into account. The authentication process at the identity management node triggers the determination of control rules at the PCRF.

The authentication information may be any kind of information relating to the UE authentication and obtained upon authenticating the UE that initiates an access to a service. The authentication information may notably comprise information indicating that the UE has been recently authenticated, the type of authentication the UE went through, and/or the level of authentication applied to the UE. Providing authentication information to the PCRF enables, for example, the provision, in a timely manner, of specific control rules for allowing a fast and reliable access to a corporate intranet, thus easing telecommuting, i.e. working from home using a computer connected to the employer's network (usually via the Internet). More generally, this enables the dynamic provision of control rules by the PCRF, triggered by a network node in charge of authenticating the UE, so as to efficiently and timely subject traffic associated with the service to a specific packet-forwarding treatment.

In one embodiment, a method is carried out by an identity management node for participating in providing a service in a communication network for a UE. The method comprises: authenticating the UE, and then sending, to a PCRF node, a message comprising: (a) service information for identifying the service to which access is initiated, (b) identification information for identifying the UE, and (c) authentication information determined upon authenticating the UE.

In an embodiment of this method carried out by the identity management node, authenticating the UE may comprise determining that the service requires a special treatment for the UE and, complementarily, sending the message, to the PCRF node, may comprise sending a request to indicate that the service requires the special treatment.

In another complementary embodiment of this method carried out by the identity management node, authenticating the UE may comprise identifying, as the authentication information to be sent to the PCRF node, at least one of a type and level of authentication used for authenticating the UE.

In one embodiment, a method is carried out by a PCRF node for participating in providing a service in a communication network. The method comprises receiving, from an identity management node, a message comprising: (a) service information for identifying the service to which access is initiated, (b) identification information for identifying the UE, and (c) authentication information determined upon authenticating the UE. This method also comprises determining control rules to be applied to the service for the UE, wherein determining is based on the authentication information and the service information, and triggering installation of the control rules in at least one network node handling SDFs for the service, said at least one network node being hereinafter referred to as "SDF node(s)".

In an embodiment of this method carried out by the PCRF node, receiving the message, from the identity management node, may comprise receiving a request to indicate that the service requires a special treatment. A particularly advantageous embodiment is where the PCRF node determines the control rules so as to achieve, as special treatment, at least one of: an acceleration of contents delivery for the service to and from the UE; a charging type to be applied for the service; and one or more identifiers of respective applications to be detected. This list is not exhaustive and other special treatments are possible as well.

The invention also relates, in one embodiment, to network nodes comprising functional entities configured for carrying out the above-mentioned methods, and, in particular, in one embodiment, to an identity management node and, in one embodiment, to a PCRF node.

The invention also relates, in one embodiment, to a system of network nodes as described above, implemented for example using a set of programmed computers.

The invention further relates to computer programs, computer program products and storage mediums comprising computer-readable instructions configured, when executed on a network node, to cause the network node to carry out steps of a method according to any one of the above-described embodiments, or to implement the functions of a network node according to any one of the above-described embodiments. The invention yet further relates to terminal devices configured for being used in the context of the above-described embodiments and to methods for operating such terminal devices.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims. A list of abbreviations and their meaning is provided at the end of the detailed description.

Figure 1:
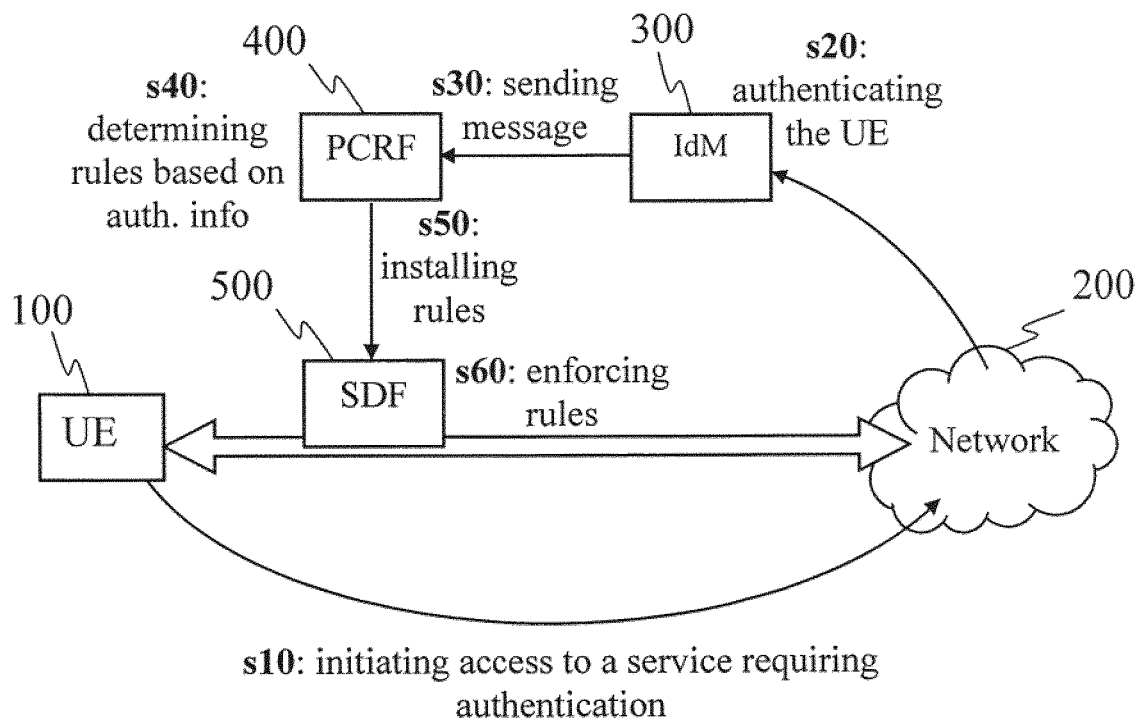
FIG. 1 schematically illustrates a method in one embodiment of the invention.

FIG. 1 schematically illustrates a communication network architecture and a method in one embodiment of the invention. The method aims at providing a service in a communication network 200. The service may for example be, but is not limited to, the provision of an access to a corporate intranet or providing an access to the home page of a service provider.

First, a UE 100 initiates s10 an access to a service requiring authentication. The UE may be any kind of user terminal such as for example, but is not limited to, a mobile phone, a smartphone, a desktop computer, a laptop, a tablet computer, a camera device, and a gaming device.

The access initiation s10 triggers a network node 300, hereinafter referred to as "identity management node", to authenticate s20 the UE 100. The authentication comprises authenticating the identity of UE 100 attempting to access a service. It is assumed here that the authentication is successful, in the sense that the identity management node 300 is able to ascertain that the UE 100 is entitled to access the service. In other words, if the authentication fails, the identity management node 300 does not carry on with step s30. Any authentication technology may be used.

After authentication, the identity management node 300 sends s30, to a network node 400 hosting a PCRF, said network node being hereinafter referred to as "PCRF node", a message comprising: (i) service information for identifying the service to which access is initiated, (ii) identification information for identifying the UE 100, and (iii) authentication information determined upon authenticating the UE 100 (i.e. determined in step s20). The message may for example be in the form of a packet or a series of packets for conveying the information from the identity management node 300 over a communication network to the PCRF node 400.

The PCRF node 400 then determines s40 control rules to be applied to the service for UE 100. The step of determining s40 is based on the authentication information and the service information, and may make use of a database hosted on, or accessible to, the PCRF node 400 for finding out, i.e. determining, which control rules are to be applied to traffic associated with the service. In particular, the identification information for identifying the UE 100 may be used as an entry key to the database and/or to check if the service is allowed for the UE. The control rules to be used are dynamically selected by the PCRF node based on the authentication information received from the identity management node 300.

The PCRF node 400 then triggers s50 installation of the control rules in at least one network node 500 handling SDFs for the service. Said at least one network node 500 is hereinafter referred to as "SDF node(s)". There may for example be one SDF node involved or more SDF nodes involved. The SDF node(s) are operating on the user plane traffic.

The SDF node(s) 500 then enforces s60 the control rules on traffic associated with the service provided to the UE 100. The enforcement may be on the traffic associated with one or more components of a service only (such as one or more media component of the service), not necessarily on all components of the service. The embodiment provides a flexible framework for detection and classification of traffic.

In one embodiment, the control rules may comprise at least one of: (i) PCC rules to be installed in an SDF node 500 hosting a PCEF (such as for example a standalone PCEF), said SDF node being hereinafter referred to as "PCEF node"; (ii) ADC rules to be installed in an SDF node 500 hosting a TDF (such as for example a standalone TDF), said SDF node 500 being hereinafter referred to as "TDF node"; (iii) PCC rules, which comprise ADC rules information, to be installed in an SDF node 500 hosting both PCEF and TDF, said SDF node 500 being hereinafter referred to as "PCEF/TDF node"; and (iv) QoS rules to be installed in an SDF node 500 hosting a bearer binding and event reporting function (BBERF), said SDF node 500 being hereinafter referred to as "BBERF node".

Figure 2:
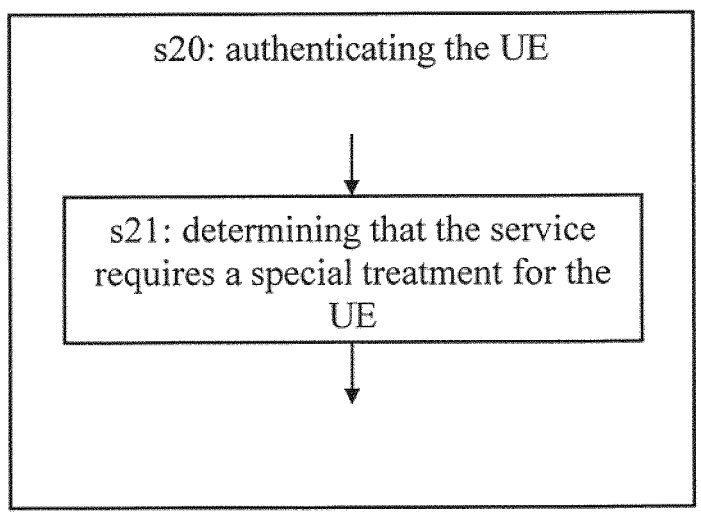
FIG. 2 is a flowchart of a step of authenticating a UE, as part of a method in one embodiment of the invention.

FIG. 2 is a flowchart of a step s20 of authenticating the UE 100, by the identity management node 300, as part of a method in one embodiment of the invention (the other steps being not illustrated in FIG. 2). Step s20 comprises determining s21 that the service (to which access has been initiated in step s10) requires a special treatment, e.g. a specific packet-forwarding treatment, for UE 100. The special treatment to be achieved by the PCRF node may for example comprise: (a) an acceleration of contents delivery for the service to and from the UE 100; (b) a charging type to be applied for the service; (c) one or more identifiers of respective applications to be detected; or (d) any combination of (a), (b) and (c). The special treatment to be applied is derived from the authentication information received from the identity management node. In particular, an identifier of an application to be detected may be an identifier of an application detection filter.

In step s21, the identity management node 300 determines that the service requires a special treatment for the UE, but the identity management node 300 does not necessarily know which special treatment is to be applied. In such case, the PCRF node 400 derives, from the authentication information received from the identity management node 300, which special treatment to be applied.

Figure 3:
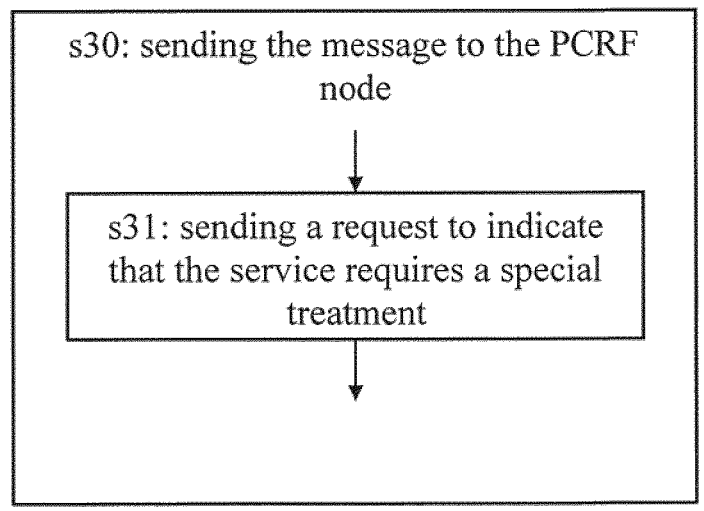
FIG. 3 is a flowchart of a step of sending a message to a PCRF node, as part of a method in one embodiment of the invention.

FIG. 3 is a flowchart of a step s30 of sending the message, from the identity management node 300 to the PCRF node 400, as part of a method in one embodiment of the invention (the other steps being not illustrated in FIG. 3). In this embodiment, the message is, or comprises, a request s31 to indicate that the service requires the special treatment.

Figure 4:
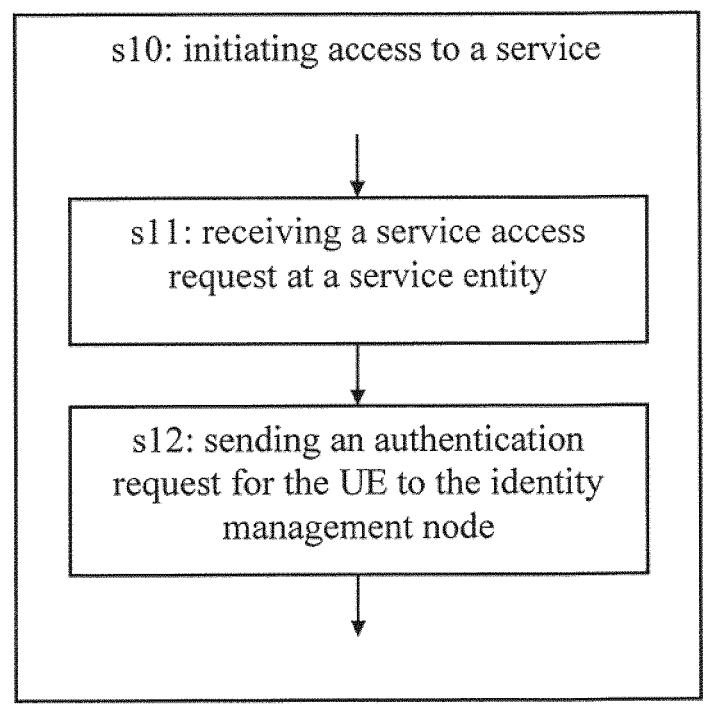
FIG. 4 is a flowchart of a step of initiating access to a service, as part of a method in one embodiment of the invention.

FIG. 4 is a flowchart of a step s10 of initiating the access to the service, as part of a method in one embodiment of the invention (the other steps being not illustrated in FIG. 4). Step s10 further comprises: receiving s11 a service access request at a service entity (i.e. a network node) in the network 200; and sending s12 from the service entity an authentication request for UE 100 to the identity management node 300. Steps s11 and s12 are optional as the identity management node 300 may, in one embodiment, be the mentioned service entity.

Figure 5:
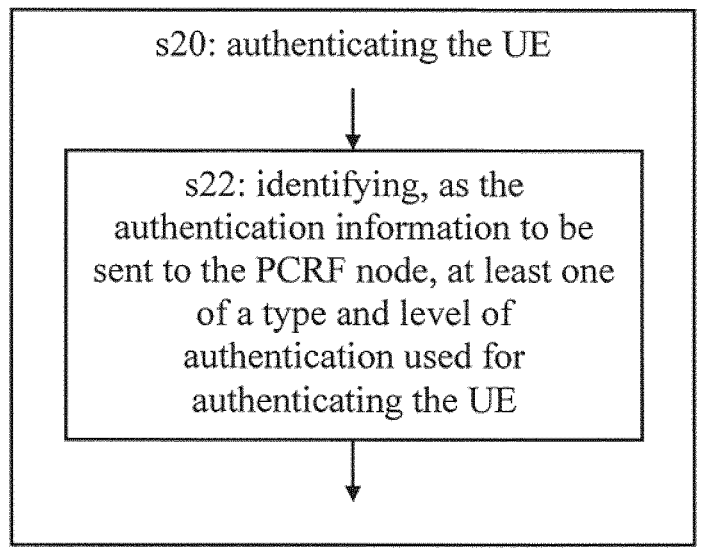
FIGS. 5 and 6 are flowcharts of a step of authenticating a UE, as part of a method in two embodiments of the invention.

FIG. 5 is a flowchart of a step s20 of authenticating, by the identity management node 300, UE 100, as part of a method in one embodiment of the invention (the other steps being not illustrated in FIG. 5). Step s20 comprises: identifying s22, as the authentication information to be sent to the PCRF node 400, at least one of a type and level of authentication that has been used for authenticating the UE 100.

In one embodiment, the authentication information identifies the authentication technology used by the identity management node 300.

Figure 6:
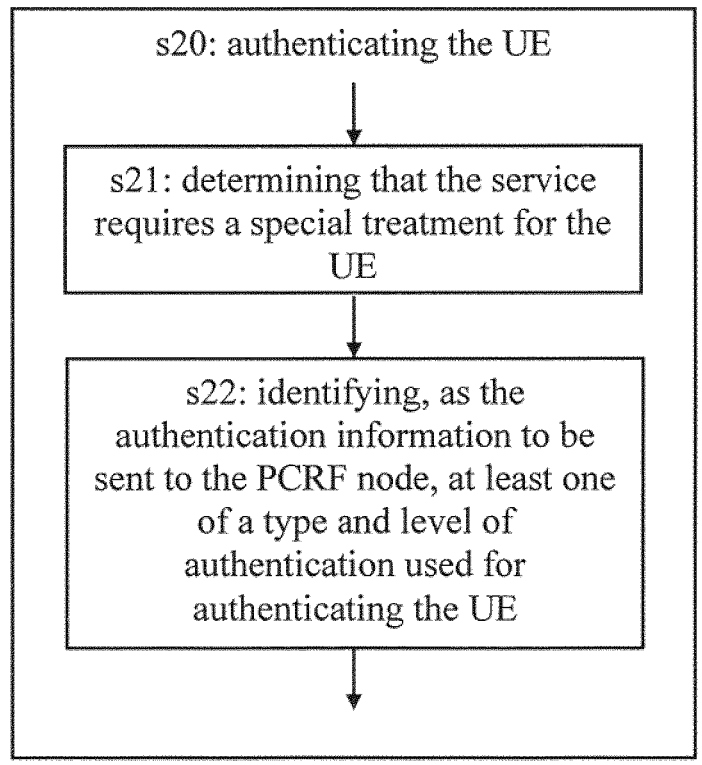

FIG. 6 is a flowchart of a step s20 of authenticating UE 100, by the identity management node 300, as part of a method in one embodiment of the invention (the other steps being not illustrated in FIG. 6). This embodiment combines both embodiments of FIGS. 2 and 5. Namely, step s20 comprises: determining s21 that the service requires a special treatment for UE 100, and identifying s22, as the authentication information to be sent to the PCRF node 400, at least one of a type and level of authentication that has been used for authenticating UE 100.

Now, to further understand the advantages of embodiments of the invention, the context in which some embodiments of the invention have been developed and may be put into practice will be explained in more detail, followed by the description of further embodiments.

In the context of providing data access to mobile terminal users and providing a network architecture to do so, it is desirable to avoid a poor quality of experience (QoE) especially in some situations, such as for example when users (being potential customers) are attempting to access the main web page of a service provider, or when employees are attempting to access their company's intranet, for telecommuting (i.e., working from home). If the main web page of the service provider takes a long time to load, users may leave the web page, thus leading the loss of potential customers. If access to the company's intranet is not fast enough, employees' working ability may be impaired.

Having this in mind, some non-published internal reference implementations (NPIRI) have been developed such as the following ones, referred to as NPIRI (A), (B) and (C) respectively:

NPIRI (A): In order to apply specific policies or to accelerate content delivery in the mobile access networks, technical solutions may be based either on the detection capabilities of the TDF or PCEF to identify a specific service or on the capability of the content provider to request a special treatment for the service.

NPIRI (B): Telecommunication grade services may be provided, enabling the execution of services close to the final end user with low latency, and the appropriate bandwidth and policies. Software-defined network (SDN) solutions may provide flexibility and programmability in that respect.

NPIRI (C): In order to enhance the way in which the network is service aware, and for efficiently selecting the right policy, bandwidth, security or network application, a so-called SDN service chaining solution may be provided.

Figure 7:
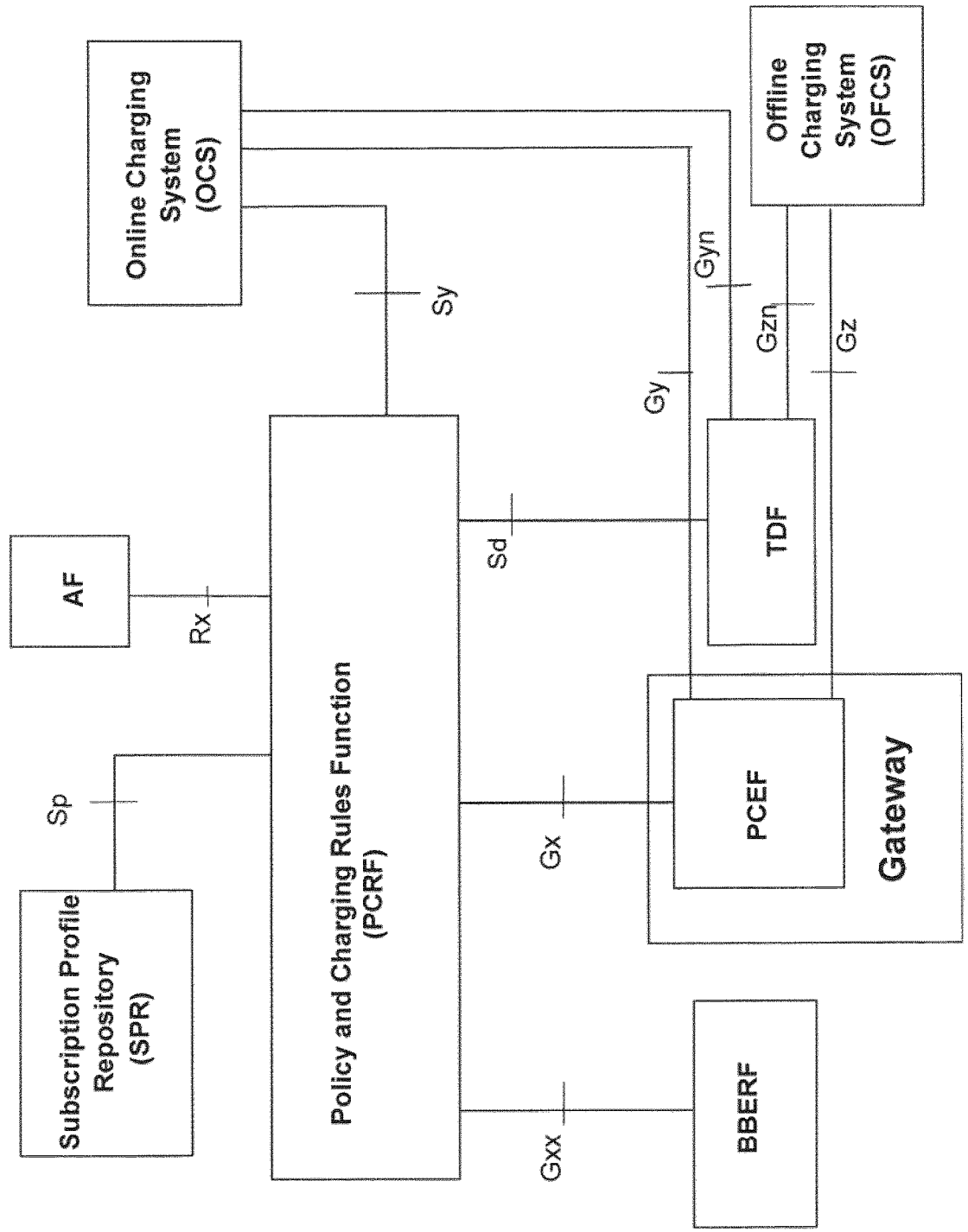
FIG. 7 schematically illustrates a PCC architecture in the context of which some embodiments of the invention have been developed and may be carried out.

In order to allow a content provider to request a special treatment for its service in accordance to NPIRI (A), the Rx interface in the 3GPP PCC architecture may be used. The architecture that supports PCC functionality is schematically depicted in FIG. 7 (taken from reference [1]).

As mentioned above in the "Background" section, the PORE is a functional element that encompasses policy control decision and flow based charging control functionalities. The PCRF provides network control regarding the SDF detection, gating, QoS and flow based charging (except credit management) towards the PCEF, Via the Gx interface, using PCC rules, the PCRF instructs the PCEF regarding the treatment of each SDF that is under PCC control. The PCRF receives session and media related information from the application function (AF) via the Rx interface.

The AF is a functional element offering applications the control of IP bearer resources according to what has been negotiated. The application service is delivered in a different layer (i.e. transport layer) from the one the service has been requested (i.e. signalling layer). One example of AF is the Proxy Control Session Control Function (P-CSCF) of the IMS Core Network (IM CN) subsystem. The AF communicates with the PCRF to transfer dynamic session information (i.e. description of the media to be delivered in the transport layer). This communication is performed using the Rx interface.

Figure 8:
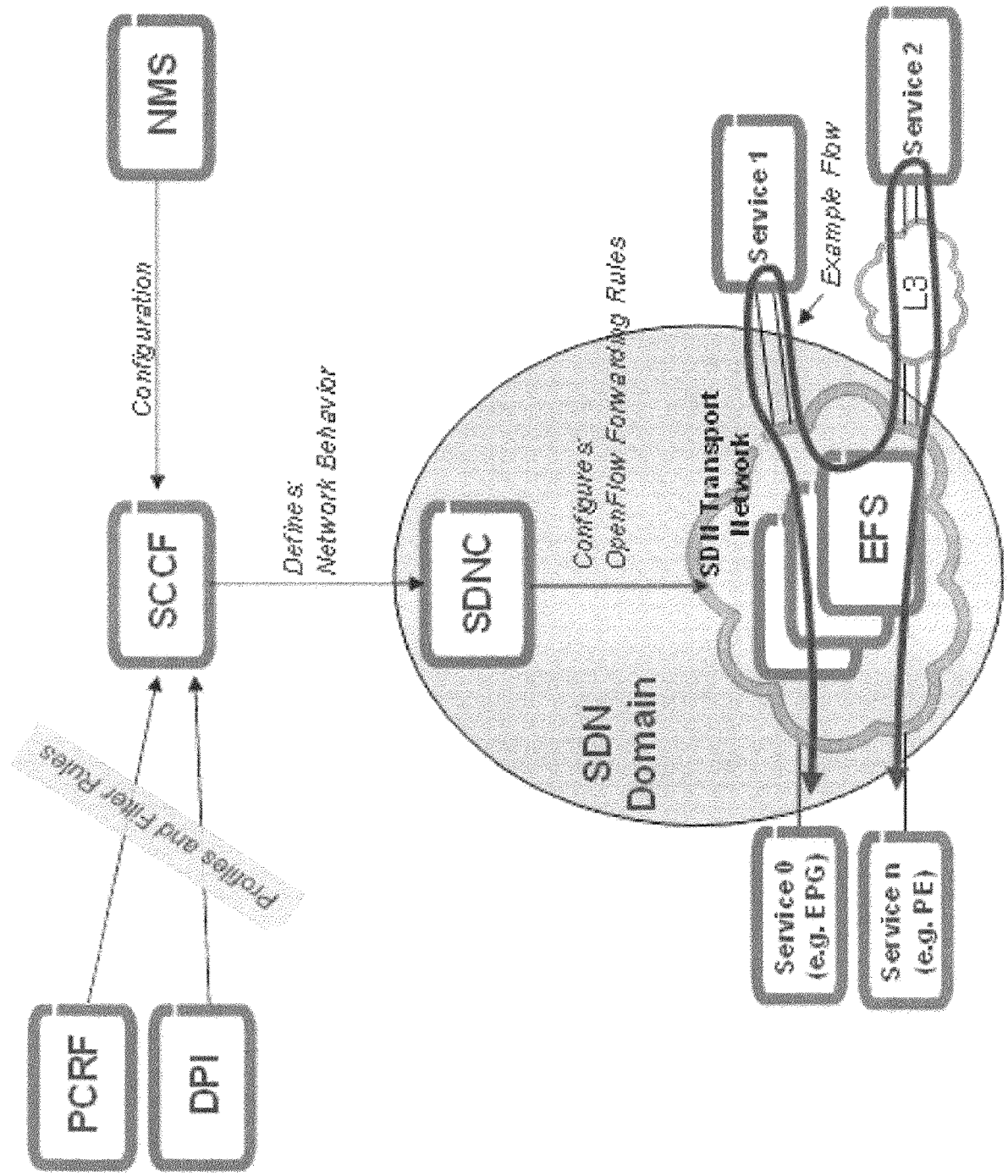
FIG. 8 schematically illustrates a system according to a non-published internal reference implementation in order to explain the context in which some embodiments of the invention have been developed.

In order to efficiently provide a special treatment for a service in accordance to NPIRI (C), the SDN service chaining mechanism may be used. FIG. 8 schematically illustrates a SDN service chaining solution which uses the technique of software-defined networking to steer data flows (to route data flows) through a defined sequence of services (e.g. content filtering application, security gateway, DPI box for reporting specific events). This sequence of services that the data flow traverses is called a service chain.

Data flows are classified according to filtering criteria defined in PCRF, the DPI and the SCCF:

(i) The PCRF defines filters based on IP session information received via the Gx interface, and subscriber profile. Examples of filters defined in the PCRF may be:
  a filter that detects IP sessions that belong to Gold users;
  a filter that detects users IP session accessing from an specific access, e.g. WLAN; or
  a filter that detects the IP session belongs to a specific type of user (e.g. non-Gold users) accessing from a specific access (e.g. WLAN).

Using these filters, the PCRF classifies the user IP session (for example, assigning a specific Profile-Id for each IP session that matches each specific filter) and notifies SCCF.

(ii) The DPI notifies the SCCF about the detection of a specific application in the IP session data flow.

(iii) The SCCF combines both pieces of information received from DPI and PCRF, and together with own filtering criteria, determines the network behaviour that the SDN controller (SDNC) has to configure in the transport network (i.e. in the user plane). For example, the SCCF indicates the network services that have to be chained for the ongoing data flow.

Traffic steering is applied in the SDN transport network. The SDNC may indicate to an OpenFlow Switch (OFS) the forwarding behaviour using, for example, the OpenFlow protocol. See for example https://www.opennetworking.org/sdn-resources/onf-specifications/openflow/ for more details.

The PCC architecture discussed above with reference to FIG. 7 has proved to be effective, covering many technical situations required nowadays. However, there are technical situations that are not covered by the standardized PCC architecture, requiring new technical solutions. Those are discussed below ("Static services", "Dynamic rules provisioning in real-time", "Encrypted traffic", "Sponsored services") along with advantages of some embodiments of the invention in these situations. For the purpose of this discussion and for the sake of simplicity, the term PCEF/TDF indistinctly refers to PCEF, TDF, and PCEF/TDF.

Static Services

Nowadays, the PCEF/TDF can be provisioned with predefined or static rules that depend on the operator knowing the traffic pattern beforehand. However, the operators usually do not configure all the possible static rules, because their simultaneous activation negatively affects the performance. As a consequence, most of the traffic is often classified as default traffic.

Some embodiments of the invention make it possible to notify in real time the activation and deactivation of static rules, in reaction to the activation and deactivation of the service—thanks to the triggering at the identification management node in charge of the authentication. This leads to an increase in the number of services that can be detected and classified by the PCEF/TDF, maintaining the performance of the PCEF/TDF, which in turn improves the opportunities for the operator to increase the knowledge about service usage.

Dynamic Rules Provisioning in Real-Time

Detecting brand new services in the user plane is often a complex task. If the operator wants to engage dynamically with service providers, this is a problem because, each time a service provider changes the service delivery characteristics, new parameters have to be provided to the operator in order to allow the service detection via static rules. Nowadays, control rules can be provisioned in real-time and/or in a self-configuration manner. Based on the capabilities offered by Rx interface, the service provider can indicate to the PCRF the control rules needed on the IP bearer for the delivery of the service.

Some embodiments of the invention make it possible to use the authentication interfaces to convey to the identity management node the instructions to the PCRF in order to control the IP bearer for the delivery of the service. This leads to a simplification of the service provider interfaces to the mobile operator and to extend the applicability field for the dynamic policy rules to any type of service.

Encrypted Traffic

With the rise of privacy concerns, a considerable number of service providers are now starting to encrypt their traffic peer-to-peer. This is a problem for PCEF/TDF systems that may no longer be capable of detecting that a particular service is being used.

In accordance with some embodiments of the invention, a solution to this service detection problem is to have the service provider delivering the service parameters at the same time as when it is indicated that the service is being used.

Sponsored Services

In today's mobile broadband (MBB) networks, most popular service providers' content (e.g. social networks, music, etc.) are being addressed via specific subscription bundles that operators offer as unlimited services with specific fees. To do so, the operator relies on the statically configured DPI capabilities to zero rate, namely not charging, such content to users who have subscribed to such service. The static nature of the services makes the DPI detection configuration inflexible.

Some operators have initiated a new technique called sponsored services. External content provider parties can sponsor data traffic towards specific sponsored sites (see e.g.: "AT&T Introduces Sponsored Data for Mobile Data Subscribers and Businesses", AT&T web site, Jan. 6, 2014, retrieved from http://www.att.com/gen/pressroom?pid=25183&cdvn=news&newsarticleid=37366).

This technique is especially attractive in some situations. This can quickly attract MBB data users, whose traffic is sponsored, to enterprise and corporation content-sites. The technique itself represents a win-win-win solution for users, operators and corporations:

Enterprises can pay for the data employees use for specific work-related applications and services;
Users can "bring their own device," meaning that the data consumed in enterprise-sponsored-sites or in corporate-sites is not charged to their regular MBB data bundled;
Operators may establish SLA that monitor the amount of traffic relating to the sponsored content, hence extending the use of the network.

An aspect of sponsor content is that user authentication-level can be linked with the sponsored content. This means that identity management capabilities can be associated to actions towards sponsored content (e.g. zero-rate or specially reduced charging, high QoS, Optimization (in case of video), etc.). In some embodiments of the invention, such process can be automated and dynamic.

Some embodiments of the invention address the problem of providing flexibility in a PCC architecture so as to provide detection systems that may embrace a broad range of technical setups. In some embodiments, identity management requests from UEs towards an identity management node (IdM) trigger the management of control rules in the user plane. In other words, some embodiments of the invention provide service detection at user authentication.

With the authentication information originated in the IdM, the PCC architecture can differentiate the services enabled to the subscriber that are associated with the provided service. This new technique gives the possibility for a standard mobile subscription user to enjoy a premium service (sponsored by his corporation) for the traffic associated with his corporate access, reducing (for example) the constraints usually associated with telecommuting.

Figure 9:
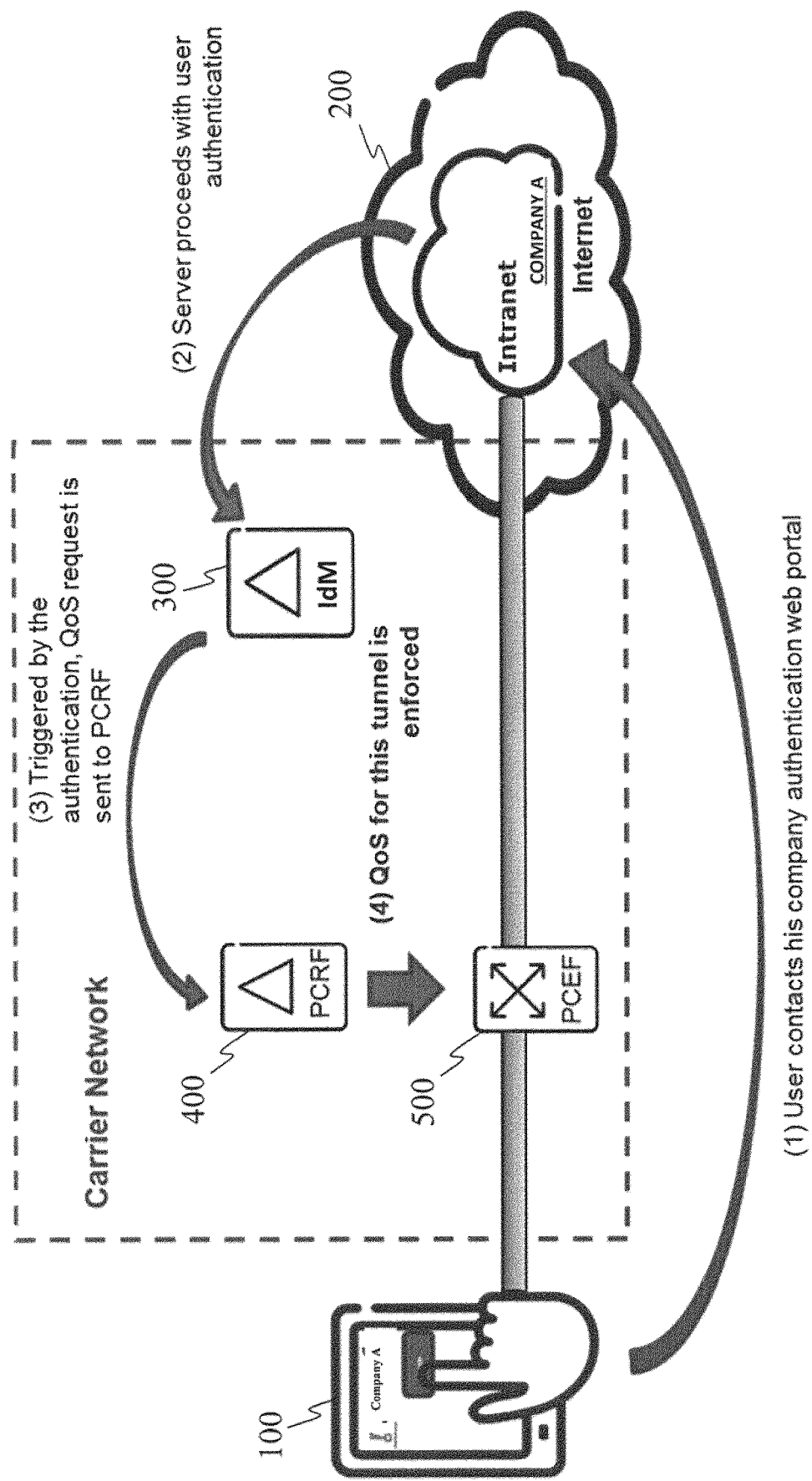
FIG. 9 schematically illustrates a method in one embodiment of the invention.

In one embodiment, as illustrated by FIG. 9, once a UE 100 is authenticated to access a company intranet (in FIG. 9, "company A" intranet is given as example), the identity management node (IdM) 300 triggers a request towards the PCRF node 400 to set the appropriate PCC rules for this UE and this service. Rules are removed at detection of service stop at PCEF/TDF 500 or at user logout from IdM authentication sessions. In particular, the embodiment of FIG. 9 involves the following steps:

(Step 1) UE 100, which is operated by an employee of Company A, having a standard mobile subscription has to connect to his company intranet to work from home. To do so, the UE 100 connects to the corporate authentication web page. (This step corresponds to step s10 illustrated in FIG. 1).

(Step 2) For authentication purposes, the IdM 300 is contacted.

(Step 3) Once the IdM 300 has asserted the authenticity of the UE (this step corresponds to step s20 illustrated in FIG. 1), the IdM 300 checks whether a specific treatment is needed for the IP traffic flow. If so, the IdM 300 creates a message and sends it to the PCRF node 400. (This step corresponds to step s30 illustrated in FIG. 1). At that occasion, the PCRF node 400 may be notified about the authentication level used.

(Step 4) The PCRF node 400 then determines the specific treatment applicable to the service. For example, whether the delivery of the content is to be accelerated is determined. The PCRF node 400 then dynamically generates control rules for the traffic associated with the service, and a PCEF node 500 is contacted for the corresponding enforcement of these control rules. (This step corresponds to steps s40 and s50 illustrated in FIG. 1).

Figure 10:
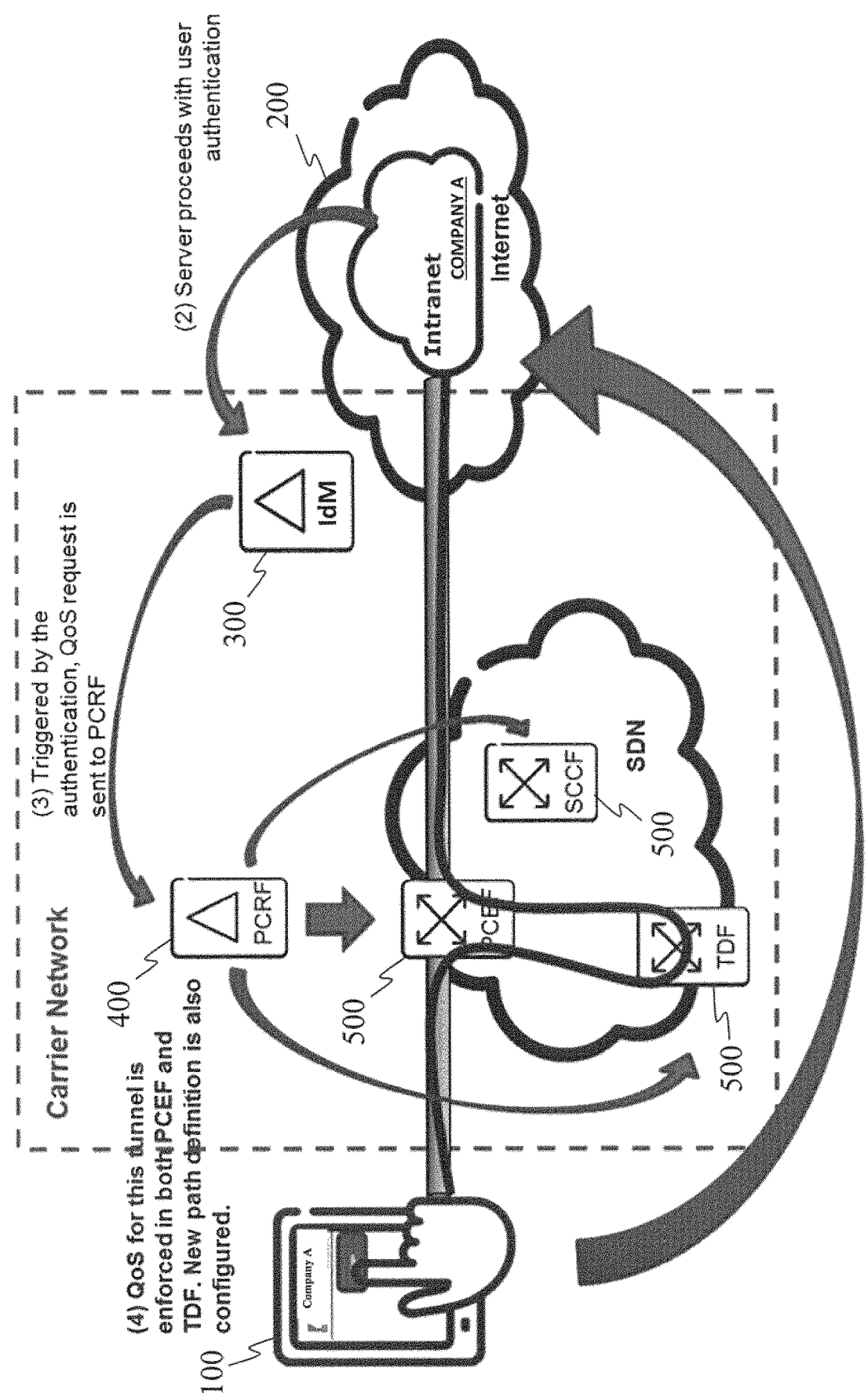
FIG. 10 schematically illustrates a method in one embodiment of the invention, involving integration with a software-defined network (SDN) architecture.

In one embodiment, as illustrated by FIG. 10, a dedicated DPI component or a different route is provided in the user plane for a company's access traffic.

In such a context, the steps discussed with reference to FIG. 9 may also apply. Furthermore, the authentication not only triggers the setup of new PCC rules on the PCEF node 500, but also dedicated QoS rules on the dedicated DPI component (part the SDN domain) and a notification towards the service chaining control function (SCCF) of the new SDN configuration. FIG. 10 schematically illustrates this configuration.

(Steps 1-3) Steps 1-3 are the same as those described in relation to FIG. 9.

(Step 4) The notification received from IdM 300 may trigger in the PCRF node 400 a change in the user profile and consequently new PCC Rules (e.g., disabling online charging for the traffic associated with the corporate tunnel). In addition to the actions discussed with reference to FIG. 9, the PCRF node 400 may also install, in step 4, QoS rules in dedicated DPI equipment for the service delivered and may instruct the service chain controller (SCCF) to configure the carrier SDN. As a result, the user traffic associated with the connection towards the corporate intranet (path transiting by TDF in FIG. 10) takes a different path. When the corporate IdM 300 detects the user log-off, it can notify the operator PCRF node 400 so that the installed rules may be removed and the initial configuration may be reinstated.

Some embodiments involve a new interface between an IdM and the PCRF node. With references to FIGS. 9 and 10, the IdM has been mentioned as a logical entity that provides authentication for the UEs (e.g. telecommuting employees). In some embodiments, the IdM may be distributed into different nodes, depending for example on the authentication technology used.

Figure 11:
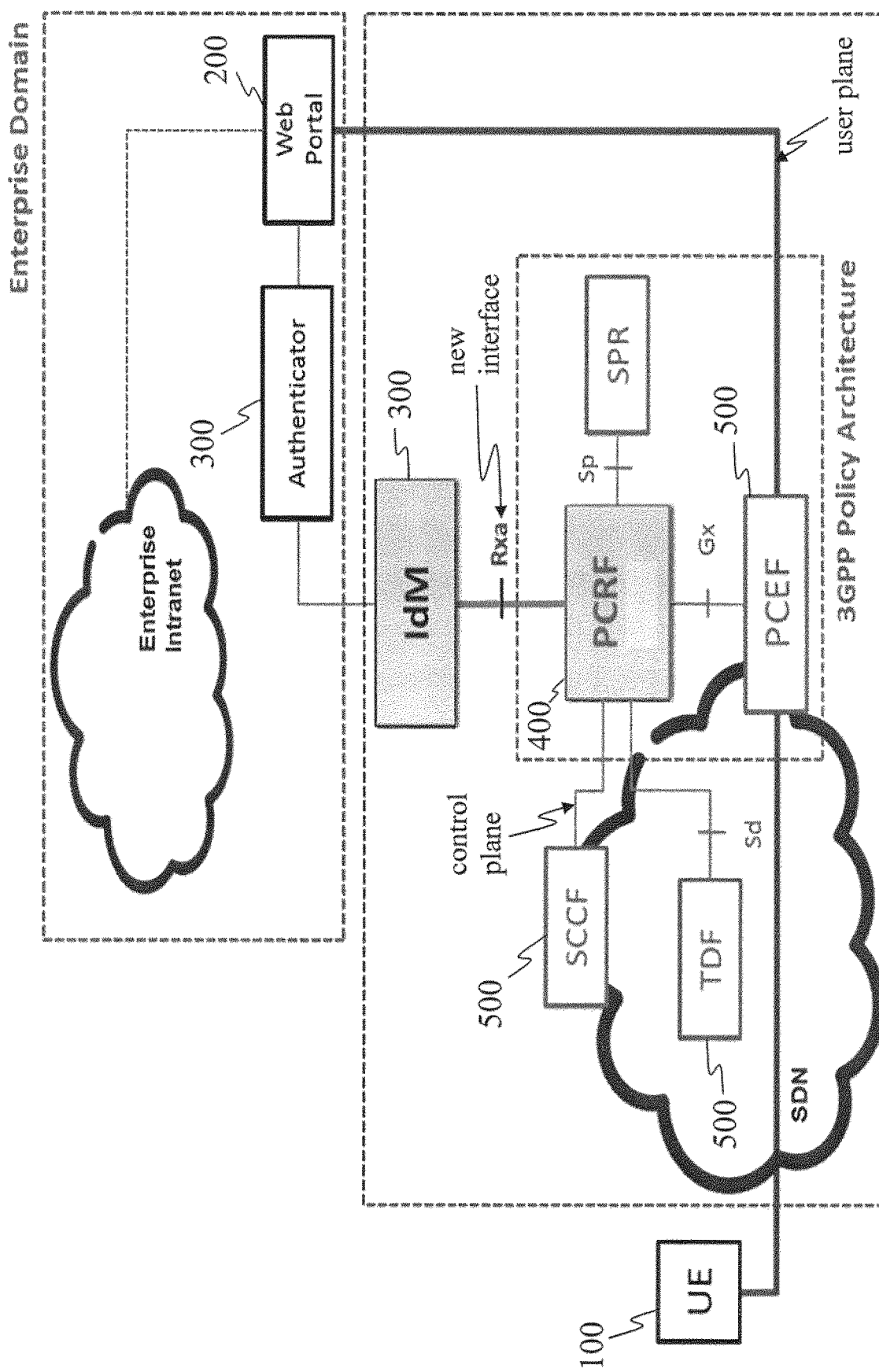
FIG. 11 schematically illustrates a network architecture in one embodiment of the invention.

There are technical situations where not only authentication for an intranet is required but also QoS enhancement or charging differentiation for the traffic associated with that access. For a seamless notification/request, a new reference point connecting both domains is used in some embodiments of the invention. In Hg. 11, this new reference point is represented as "Rxa", connecting the IdM 300 from the Enterprise domain to the PCRF node 400, the policy controller of the PCC architecture. FIG. 11 schematically illustrates, notably, the IdM functional entity and the PCC architecture. The Rxa reference point allows the extension of authentication procedures carried out by the IdM, with a request to the PCRF node for dynamic PCC rules installation (QoS enhancement) based on authentication information. The Rxa reference point also allows the IdM to request the PCRF node to remove the installed rules at user logoff of his SSO session. In such case, the PCRF node notifies the IdM of the detection of the end of the service delivery.

The proposed name of this interface, i.e. Rxa, is a reference to the standardized 3GPP Rx reference point (see 3GPP TS 29.214 V12.2.0 (2013-12), Technical Specification, 3rd Generation Partnership Project; Technical Specification Group Core Network and Terminals; Policy and Charging Control over Rx reference point (Release 12), hereinafter referred to as reference [2]).

To the best of the inventors' knowledge, the IdM request for dynamic policy rules installation is unknown in the art. From the PCC architecture's perspective, a functional entity acting as a client for dynamic policy already exists: the AF. However, the 3GPP Rx interface, as specified nowadays, fails to cover the IdM procedure enhancements as herewith proposed and to support the technical situations herewith addressed.

The 3GPP Rx reference point structure, and its standardized procedures, is a starting point for the new reference point, and for that reason it is named "Rxa", meaning Rx with authentication information enhancement.

The Rxa reference point may re-use the Rx commands defined in reference [2], adding the authentication information.

Some technical situations are covered re-using Rx commands and procedures (e.g. Media-Sub-Component), as dynamic PCC rules installation with the service information gathered by the IdM. However, there is no Rx parameter to be re-used to send authentication information towards the PCRF.

For that reason, it is proposed, in one embodiment, not only to re-use the Rx reference point commands and procedures linking the IdM/Authenticator and PCRF, but also to include a so-called Authentication-Type parameter.

The Authentication-Type parameter may be of type Enumerated, and it determines the authentication technology (i.e., type of authentication), used by the authentication server.

Some exemplarily proposed values may be:
User/password
GBA
Certificate
Biometrics
SIM-based In one embodiment, an Authentication-Type parameter is used as part of the Rxa reference point. In this embodiment, the operator is now able to offer to the service provider (e.g. a company, such as "East India Corporation") a catalogue of policy actions (i.e., a description of the actions, the treatment to apply to each service provided by the enterprise) based on the Authentication-Type parameter value. The services for which policy actions apply may for example be exposed under a service level agreement (SLA). In such a manner, the external service provider can match the Authentication-Level to be sent with a recognized service patterns (e.g. URL, five tuples).

Table 1a presents an example of a SLA relation between the mobile operator and the external service provider (e.g. East India Corporation) and describes the relation between the Authentication-Type and the policy action.

TABLE 1a

Example of SLA table for the operator and an external service provider (basic scenario)

| Authentication-Type | Policy Action | |
| --- | --- | --- |
| | Service [1] | Action |
| User/Password | e-mail | Gating: Deny service out of business hours QoS 1 |
| | SFTP | Gating: Deny service out of business hours QoS 2 |
| | Internet access | Content Filtering: Only Academic pages |
| Certificates | e-mail | Always allowed QoS 2 |
| | SFTP | Gating: Deny service out of business hours QoS 3 |
| SIM-Based | MM Telephony | e2e QoS, high priority |
| | Internet access | Content Filtering: Only suppliers pages |
| GBA | Restricted e-mail | Always allowed QoS 2 |
| | Restricted VoD | Gating: Deny service out of business hours QoS 3 |

[1] Requires the five tuple to identify the service.

Table 1a may be mostly implemented using a database in the PCRF node, or accessible to the PCRF node, as it will be explained below.

The PCRF node receives (step s30 in FIG. 1) from the IdM the authentication information, the service provider identifier (as mandatory service information) and (optionally) the service five tuple information. This information is inputted to the PCRF node to identify the policy action to take (step s40 in FIG. 1).

Each possible policy action may be configured in PCRF. And each policy action has a translation to a set of control rules (e.g., PCC rules, QoS rules, ADC rules) to install to PCEF/TDF/BBERF nodes. These control rules describe for the PCEF/TDF/BBERF nodes the specific treatment the network has to apply for the service for the user.

The enforcement of these policy actions (step s50 in FIG. 1) may for example imply, but is not limited to, an acceleration of the service (because the policy action translated into a control rule that allows a higher bandwidth than any other previously installed control rules that corresponded to services of the user's basic subscription) and/or a different charging pattern (e.g. if the service is sponsored by the corporation). That is, the policy actions may result in any of the possible actions allowed today by the Gx, Gxx and Sd reference points, as respectively referred to in sections 5.2.2, 5.2.7 and 5.2.8 of reference [1].

The SLA agreement implemented in the IdM may comprise an indication as to whether a special treatment by the PCRF is required for the service for which the UE is being authenticated. The IdM table to check whether the service needs a special treatment may for example be as shown in Table 1b.

TABLE 1b

| Service Provider | Service Id | Contact PCRF |
|---|---|---|
| East India Corporation | Any | YES |
| East India Corporation-Multimedia Telephony | MM Telephony | YES |
| East India Corporation-Multimedia Telephony | Internet access | NO |

Having the Authentication-Type information together with the existing Rx parameters, the operator gains additional input for the policy action identification, compliant to the SLA presented above with reference to Table 1a.

Table 2 summarizes the information that Rxa can provide for policy action identification at the PCRF node. Media Components information is optional.

TABLE 2

| Rxa Input Information for Policy Action Identification | |
|---|---|
| AF-Application-Id | Enterprise Identifier |
| Authentication-Type (NEW) | Authentication Method |
| Media Component | Service Identifier |
| Media Type (optional) | |
| Media Component 5 Tuple (optional) | Service Five Tuple |

When the Rxa message is sent to the PCRF node from the IdM (see steps 6-7 in FIG. 12), the PCRF node has to take a policy decision based on that information. The possible combinations may be different, as in some cases the media information associated to the service may be already present in the PCRF node, while in other cases this information is not present. Table 3 shows an example of possible combinations that may be implemented in the PCRF node.

TABLE 3

| Service Identification Pattern | | | |
|---|---|---|---|
| Application Identifier | Authentication Type | Media Pattern | Service |
| East India Corporation | GBA | type = video DL port = 4900 DL Source IP = 109.XX.YY.ZZ | Restricted VoD |
| East India Corporation | User/Password | Any | any |
| East India Corporation - Multimedia Telephony | SIM-Based | Any | East India Corp MMTEL |

In the second row of Table 3, there is an exemplary combination where the received Application Identifier has the value "East India Corporation" and the Authentication-Type has the value "User/Password". No additional information about specific service pattern is provided. In this situation, the PCRF must comply with the SLA pre-defined actions, exemplified for this particular case in the Table 4.

TABLE 4

| Policy Action Identification Pattern: No service is identified | | | |
|---|---|---|---|
| Application Identifier | Authentication Type | | Policy Action/Subscriber Group |
| East India Corporation | User Password | e-mail | Gating: Deny service out of business hours QoS 1 |
| | | SFTP | Gating: Deny service out of business hours QoS 2 |
| | | Internet access | Content Filtering: Only Academic pages |

The PCRF then uses the output of this identification (policy action) and uses it as an additional input in the policy engine to derive the corresponding policy/QoS rules to apply in the PCEF and/or TDF.

In some cases, the PCRF may have already the particular service associated with the received parameters: first and third row of Table 3. In those situations, the PCRF may immediately associate the service with the actions to take, as exemplified in Table 5.

TABLE 5

| Policy Action Identification Pattern: service is identified | |
|---|---|
| Service | Action |
| Restricted VoD | Gating: Deny service out of business hours QoS 3 |
| East India Corp MMTEL | e2e QoS, high priority |

With the output of the service identification, the PCRF has another input for its policy engine that uses that information to decide which control rules to apply in the PCEF or TDF.

Tables 3, 4 and 5, and the accompanying description, illustrate how the output actions may be determined by the PCRF, correlating the received information with the action tables it maintains internally. That technical situation is for a basic integration with a mobile packet core. In the cases where SDN based networks are implemented, the previous actions may also occur but, additionally, actions towards the service chain controller may also be configured.

For example, some particular services need additionally security when being deployed. Enterprise SFTP is an example of that kind of service. For that service deployment, the operator can use a different path, e.g. a direct route towards the enterprise access.

To include this action in the SLA, Table 1 could be modified, having an additional action possibility, as shown in Table 6:

TABLE 6

| Certificates | e-mail | Always allowed<br>QoS 2 |
|---|---|---|
| | SFTP | Gating: Deny service out of business hours<br>QoS 3<br>Secured Route X |

To comply with this SLA entry, the PCRF may use the received information to provide additional rules to the SCCF so that the traffic associated with the SFTP service delivery takes a different path.

Figure 12:
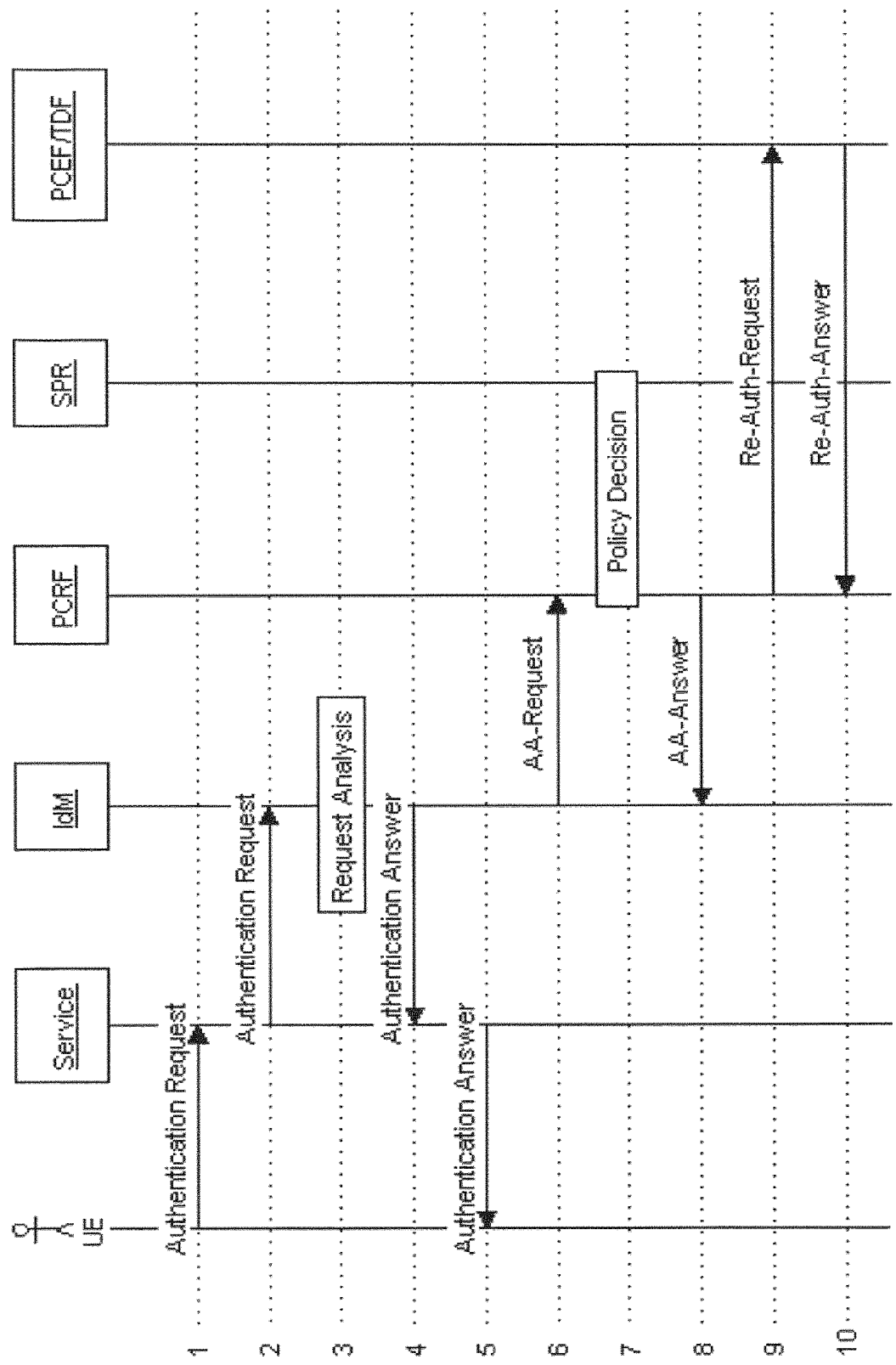
FIG. 12 is a message sequence chart of a method in one embodiment of the invention, wherein enforcement at the PCEF/TDF is triggered by authentication procedures.

The message sequence chart of FIG. 12, illustrating an embodiment of the invention, uses an Rxa reference point between IdM and the PCRF for installing control rules in the PCEF, i.e. for the creation of Rxa session. The message sequence chart has the following pre-conditions:

UE has an established IP-CAN session as specified in Figure 4.1.1 of 3GPP TS 29.213 V12.2.0 (2013-12); Technical Specification; 3rd Generation Partnership Project; Technical Specification Group Core Network and Terminals; Policy and Charging Control signalling flows and Quality of Service (QoS) parameter mapping (Release 12), hereinafter referred to as reference [3].

The steps of this message sequence chart occur when a mobile subscriber (UE), already attached and authenticated to its operator's network, decides to use a third party service which uses the UE authentication as a trigger for contacting the operator network with control signalling. This means that the third party service has an instantiated Service Provider/Relaying Party and the operator has IdM capabilities.

FIG. 12 is a message sequence chart of the PCC enforcement triggered by authentication procedures, involving the following steps:

(step 1) UE starts communication with the service provider/relaying party. This step corresponds to step s10 in FIG. 1.

(step 2) The service provider/relaying party starts communication with IdM/Authenticator. The purpose of this communication is to request authentication of the UE.

(step 3) The IdM proceeds with the authentication procedures. This step corresponds to step s20 in FIG. 1. In this step, the IdM concludes that the request type relates to an origin service provider that requires some dedicated QoS parameter. The IdM may learn this information by maintaining this information internally in a table (such as for example an internal database) or by consulting an external database.

(step 4) The IdM replies to the service provider acknowledging the UE authentication.

(step 5) The service provider replies to the UE acknowledging that the authentication request was successfully performed.

(step 6) As consequence of step 3, the IdM has the information that the particular service for which the UE was being authenticated requires special QoS treatment. The IdM starts communication over reference point Rxa with the PCRF. This procedure may for example be complemented with the procedures specified in reference [2] to provide the PCRF with session information for the specific media type used by the third party service that is implementing the service. Additionally, the IdM may include the Authentication-Type AVP with the appropriate value. This step corresponds to step s30 in FIG. 1.

(step 7) The PCRF stores the received service information, consults the UE profile, and identifies the affected IP CAN sessions for that specific UE. This step corresponds to step s40 in FIG. 1.

At this point, if no Authentication-Type information were sent by the IdM, the PCRF could only take policy decisions based on the service information provided by the IdM as in a typical Rx setup. However, with the new Authentication-Type information sent by the IdM, the PCRF can take a policy decision based on both the service information and the authentication information.

For example, a request for East India Corporation MMTEL (Multimedia Telephony) service may be accepted or rejected based on the authentication type used by the subscriber. For example, if GBA has been used as an authentication method, the request will be accepted, but if a user/password has been used as an authentication method, it will be denied.

This means that a subscriber (UE) may have a differentiated access based on his authentication profile.

(step 8) The PCRF replies to the IdM acknowledging the success of its request.

(steps 9-10) As a consequence of step 7, the PCRF updates the ongoing Gx/Sd session accordingly. This step corresponds to step s50 in FIG. 1.

Generally speaking, the IdM/Authenticator may instruct the PCRF to terminate an Rxa session with a Diameter STR command in any of the following circumstances:
  a. the user performed an explicit SSO logout at IdM, or
  b. the IdM received a user session logout indication from the SP, or
  c. Internal IdM policies evaluated after the reception from the PCRF of an Rxa session update.

Under any of these circumstances, the IdM creates a Diameter STR command to instruct the PCRF to terminate the indicated Rxa session.

Figure 13:
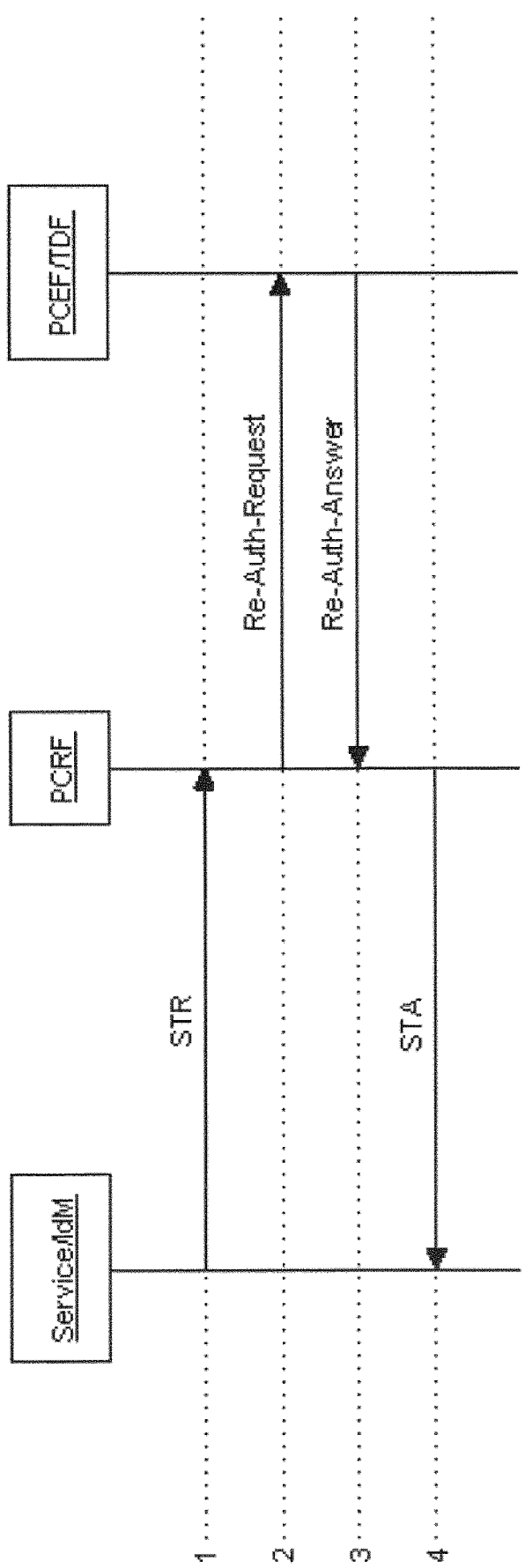
FIGS. 13 to 15 are message sequence charts of methods in three embodiments of the invention, involving a session termination.

In particular, FIG. 13 is a message sequence chart illustrating one embodiment of the invention and schematically illustrating an Rxa session termination when the above case 'c' applies:

(step 1) The IdM decides that an Rxa session has terminated, due to the internal IdM policies;

(step 2) The PCRF removes or modifies the installed PCC/ADC rules that created a dedicated bearer for the stopped application(s) in the PCEF/TDF;

(step 3) The PCEF/TDF acknowledges the indication; and (step 4) The PCRF acknowledges the session termination.

Figure 14:
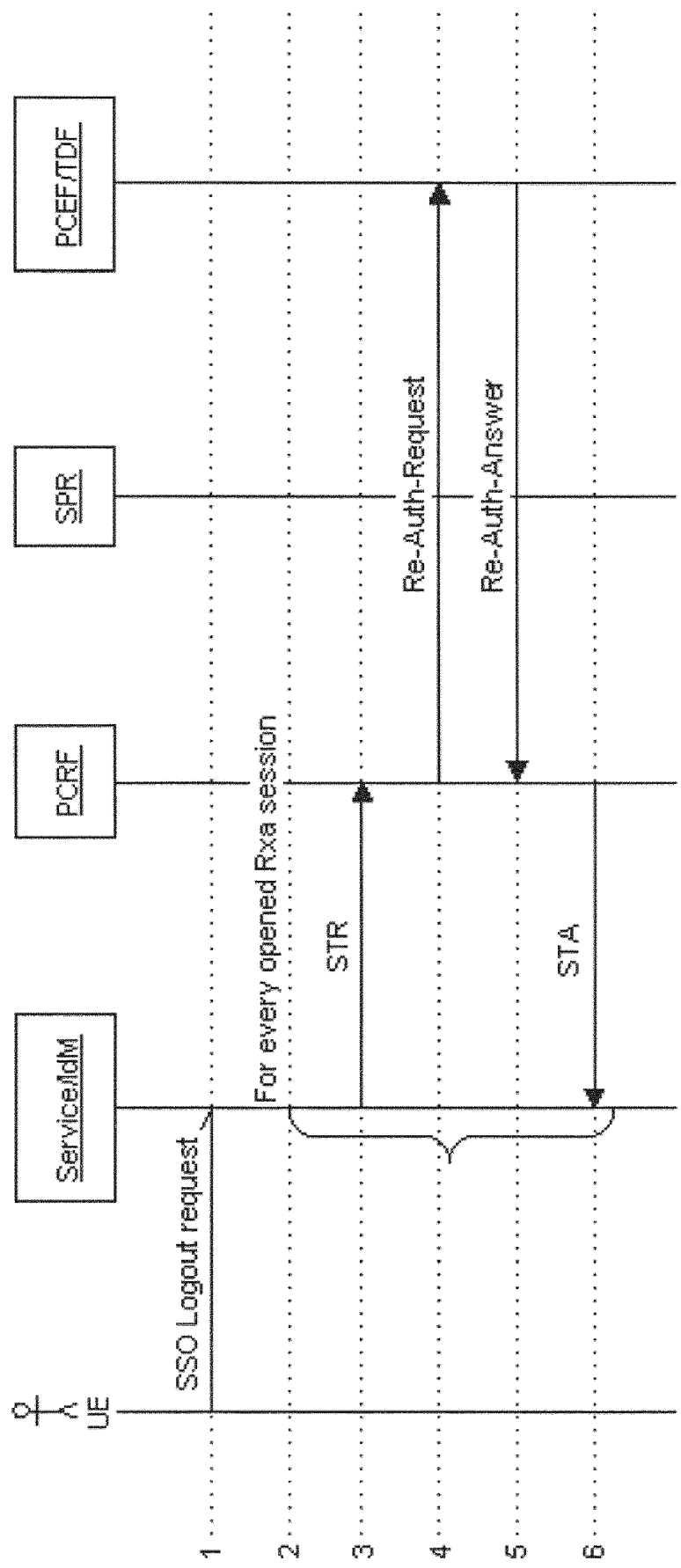

In particular, FIG. 14 is a message sequence chart illustrating an embodiment of the invention and schematically illustrating an Rxa session termination when the above case 'a' applies, i.e. the user explicitly logs off at the IdM:

(step 1) The end user enters the IdM portal and 'clicks' on the logout (Single Logout (SLO)) option;

(step 2) The IdM looks for active authentication sessions of the end user, and selects the sessions that have ongoing Rxa sessions;

(step 3) For each Rxa session, the IdM instructs the PCRF to terminate the Rxa session by sending a Diameter STR command;

(step 4-5) PCRF updates the ongoing Gx/Sd session accordingly; and (step 6) The PCRF acknowledges the session termination.

Figure 15:
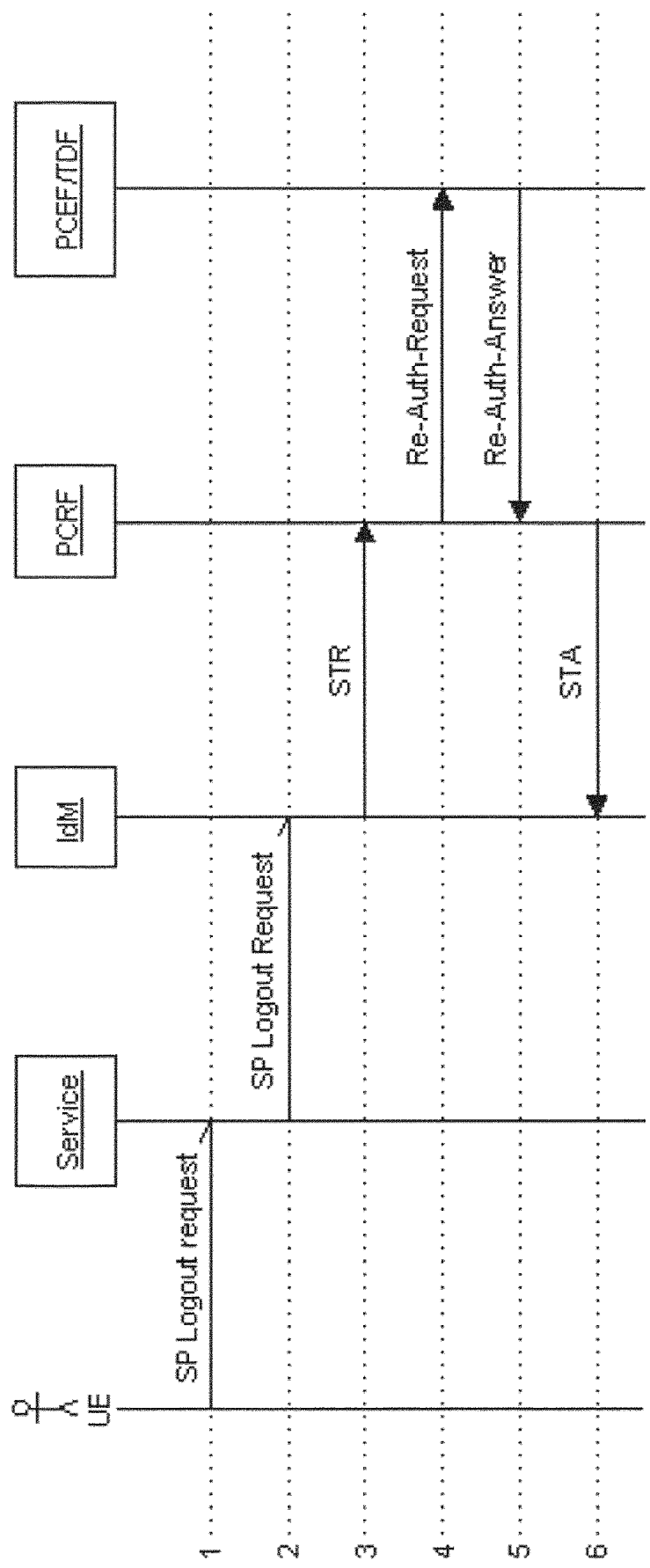

In particular, FIG. 15 is a message sequence chart illustrating an embodiment of the invention and schematically illustrating an Rxa session termination when the above case 'b' applies, i.e. the end user explicitly logoffs at the SP:

(step 1) The end user enters the Service Provider (SP) portal and 'clicks' on the logout option;

(step 2) The SP sends a Session Logout to Request to the IdM. The IdM then checks if there is a live Rxa session for this authenticated end user;

(step 3) If an Rxa session exists, the IdM instructs the PCRF to terminate the Rxa session by sending a Diameter SIR command;

(steps 4-5) PCRF updates the ongoing Gx/Sd session accordingly; and (step 6) The PCRF acknowledges the session termination.

Figure 16:
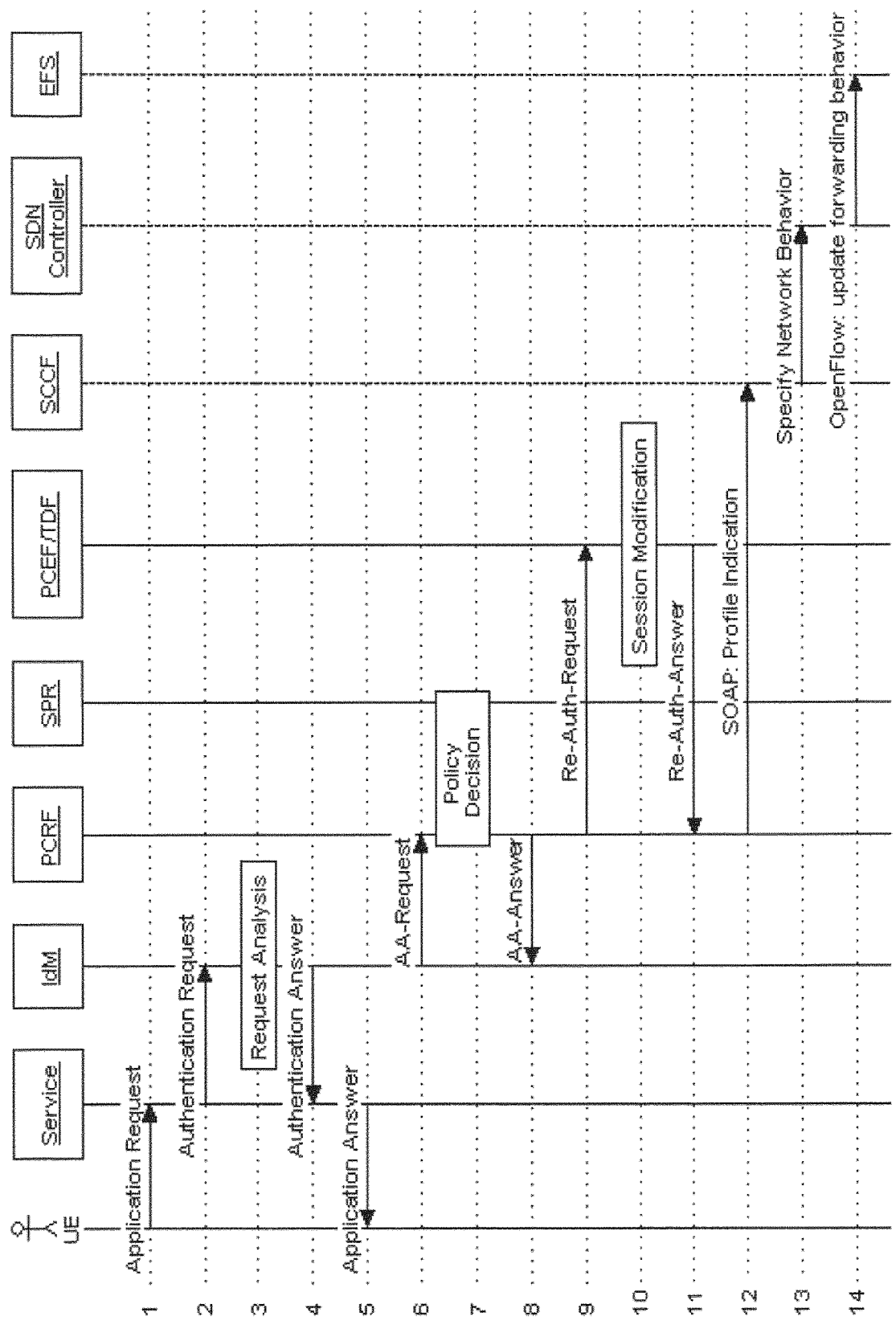
FIG. 16 is a message sequence chart of a method in one embodiment of the invention, wherein, in an architecture involving a SDN, enforcement in the user plane is triggered by authentication procedures.

The message sequence chart of FIG. 16 illustrates the integration with SDN service chaining solution at the creation of Rxa session, in one embodiment of the invention.

The main difference from the basic integration resides in that the PCRF not only updates the PCEF but also the SCCF and the TDF that are part of the SDN service chaining with the result of the policy evaluation triggered by the reception of the Rxa message.

The exemplary message sequence chart of FIG. 16 uses the reference point proposed above between IdM and the PCRF for the determination of the control rules to install in the PCEF/TDF and also for the determination of the user profile to indicate to the SCCF.

The message sequence chart has the following pre-conditions:

UE has an established IP CAN session as specified in Figure 4.1.1 of reference [3].

This flow occurs when a mobile subscriber (UE), already attached and authenticated to its operator's network, decides to use a third party service (running on internet or corporate intranet) that makes use of the UE authentication for triggering policy control on the operator side.

Thus, FIG. 16 is a message sequence chart schematically illustrating a SDN Integration during Rxa session creation, and it involves the following steps:

Steps 1-11 are the same as the ones described with reference to FIG. 12, but for the explicit disclosure of step 10 'session modification' in FIG. 16, which was omitted in FIG. 12 for the sake of simplicity.

(step 12) In step 7, the PCRF takes a policy decision based on both the service information and the authentication information. Part of that decision, and as consequence of the received authentication information, may comprise (for example) reconfiguring the network so the enterprise traffic can flow towards a dedicated router. Details about the policy action to take are provided above with reference to Tables 3 to 6.

To do so, the PCRF identifies the user profile for SDN service chaining that applies for this subscriber and notifies the SCCF making use of a SOAP notification interface.

For example, if the service identified is SFTP, and the authentication type is 'certificate', the PCRF determines the service profile to notify the SCCF is the one that indicates the subscription requires "secured route X."

(step 13) The SOAP indication triggers the re-evaluation of SCCF policies for the ongoing data flow, and with the obtained result the SCCF updates the SON Controller with the new network behaviour required for the given dataflow.

(step 14) The SON controller reconfigures the forwarding behavior of the network switches according to the network behavior specified by the SCCF using the OpenFlow standard protocol (and thus being able to include the appropriate services, as e.g. specialized TDF for reporting events).

As it is needed in the basic integration to indicate PCEF/TDF the termination of the Rxa session, it is also needed to notify the SCCF of such event.

As in the case of Rxa session creation, where the difference between the basic flow and the flow for SDN Integration is the inclusion of additional steps for the interaction with SCCF, the flow for SON Integration during Rxa session termination also differs from the basic flow in the addition of the following steps (not illustrated in the drawings):

(step 1) After updating the PCEF/TDF as consequence of the deactivation of the detected service, the PCRF indicates to the SCCF that the user profile for SDN Service Chaining related with the detected service no longer applies making use of the existing SOAP notification interface.

(step 2) The SOAP indication triggers the re-evaluation of SCCF policies for the ongoing data flow, and with the obtained result the SCCF updates the SON Controller with the new network behavior required for the given dataflow.

(step 3) The SON controller reconfigures the forwarding behavior of the network switches according to the network behavior specified by the SCCF using the OpenFlow standard protocol (and thus being able to dissolve the previously created service chain).

Thus, some embodiments of the invention optimize when PCC rules are installed or removed, since the action only occurs when the user decides to log-in in the service site, instead of at the first access of the user, and when the user logoffs.

Some embodiments also simplify the interaction between the service and the network operator: the service only needs to implement IdM interfaces, since the interface for policy control would be delegated to the IdM.

Furthermore, operators may open their network to external party partners who are ready to pay for specific service delivery conditions based on authentication-types within their service-sites. By means of the proposed trigger (authentication request towards the IdM) and interface between IdM and PCRF, operators can dynamically change the user specific service delivery conditions to third party content.

Operators may thus increase the use of their networks with the introduction of fast and high scalable new technical setups (e.g. sponsored services authentication level based, or increased QoS for content that resides under protected sites accessible only under specific authentication level).

In one embodiment, a new interface between the IdM and the PCRF is provided. The interface may for example be called the Rxa interface.

In one embodiment, a new parameter for Authentication-Type is provided as part of the new interface (e.g., Rxa interface).

In one embodiment, means are provided in the IdM to correlate the service being authenticated with the need to enforce control rules (e.g. QoS).

In one embodiment, additional means are provided in the PCRF to interact with the TDF and the SCCF based on the service detected by Rxa interface.

Figure 17:
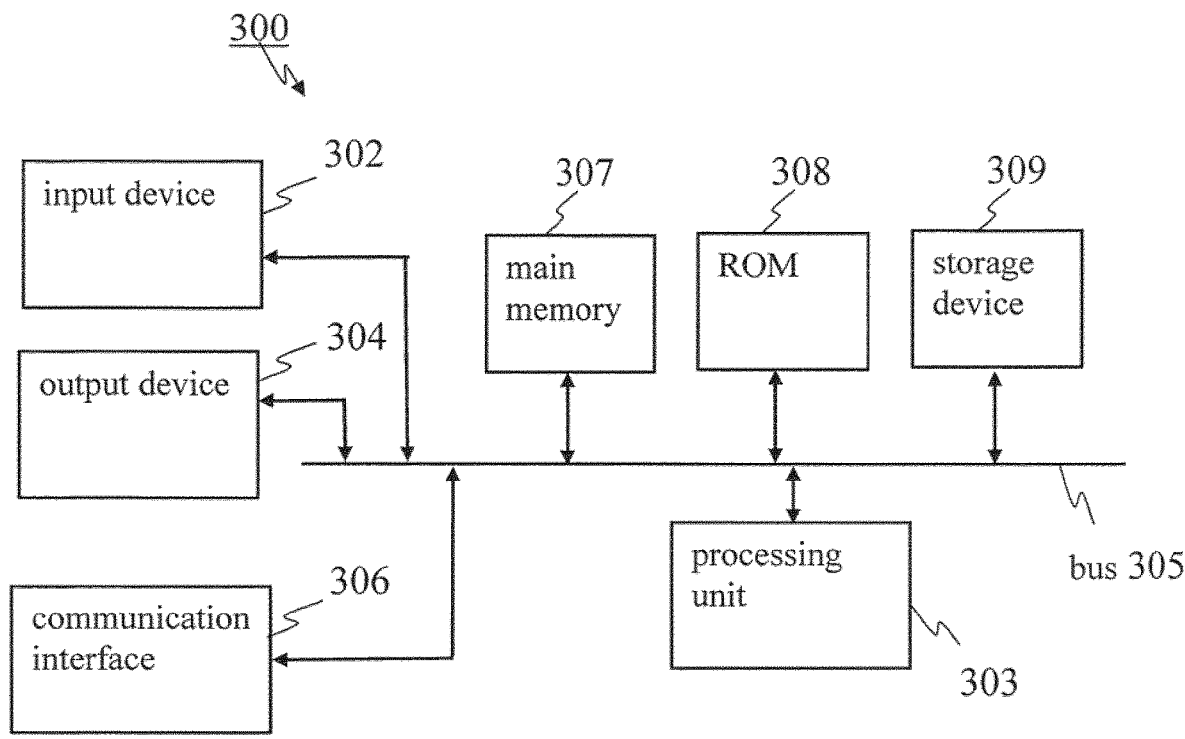
FIG. 17 is a schematic diagram of an exemplary implementation of a network node according to one embodiment of the invention.

FIG. 17 is a schematic diagram of an exemplary implementation of a network node 300 that may be used in embodiments of the invention, for example for implementing the identity management node 300 or for the PCRF node 400. As illustrated, network node 300 may include a bus 305, a processing unit 303, a main memory 307, a ROM 308, a storage device 309, an input device 302, an output device 304, and a communication interface 306. Bus 305 may include a path that permits communication among the components of network node 300.

Processing unit 303 may include a processor, a microprocessor, or processing logic that may interpret and execute instructions. Main memory 307 may include a RAM or another type of dynamic storage device that may store information and instructions for execution by processing unit 303. ROM 308 may include a ROM device or another type of static storage device that may store static information and instructions for use by processing unit 303. Storage device 309 may include a magnetic and/or optical recording medium and its corresponding drive.

Input device 302 may include a mechanism that permits an operator to input information to network node 300, such as a keypad, a keyboard, a mouse, a pen, voice recognition and/or biometric mechanisms, etc. Output device 304 may include a mechanism that outputs information to the operator, including a display, a printer, a speaker, etc. Communication interface 306 may include any transceiver-like mechanism that enables network node 300 to communicate with other devices and/or systems (such as with a network node hosting a network node hosting a PCEF, etc.). For example, communication interface 306 may include mechanisms for communicating with another device or system via a network.

Network node 300 may perform certain operations or processes described herein. These operations may be performed in response to processing unit 303 executing software instructions contained in a computer-readable medium, such as main memory 307, ROM 308, and/or storage device 309. A computer-readable medium may be defined as a physical or a logical memory device. For example, a logical memory device may include memory space within a single physical memory device or distributed across multiple physical memory devices. Each of main memory 307, ROM 308 and storage device 309 may include computer-readable media. The magnetic and/or optical recording media (e.g., readable CDs or DVDs) of storage device 309 may also include computer-readable media. The software instructions may be read into main memory 307 from another computer-readable medium, such as storage device 309, or from another device via communication interface 306.

The software instructions contained in main memory 309 may cause processing unit 303 to perform operations or processes described herein, such as the authentication step s20, the creation and transmission s30 of a message by an identity management node to a PCRF node, etc. Alternatively, hardwired circuitry may be used in place of or in combination with software instructions to implement processes and/or operations described herein. Thus, implementations described herein are not limited to any specific combination of hardware and software.

Figure 18:
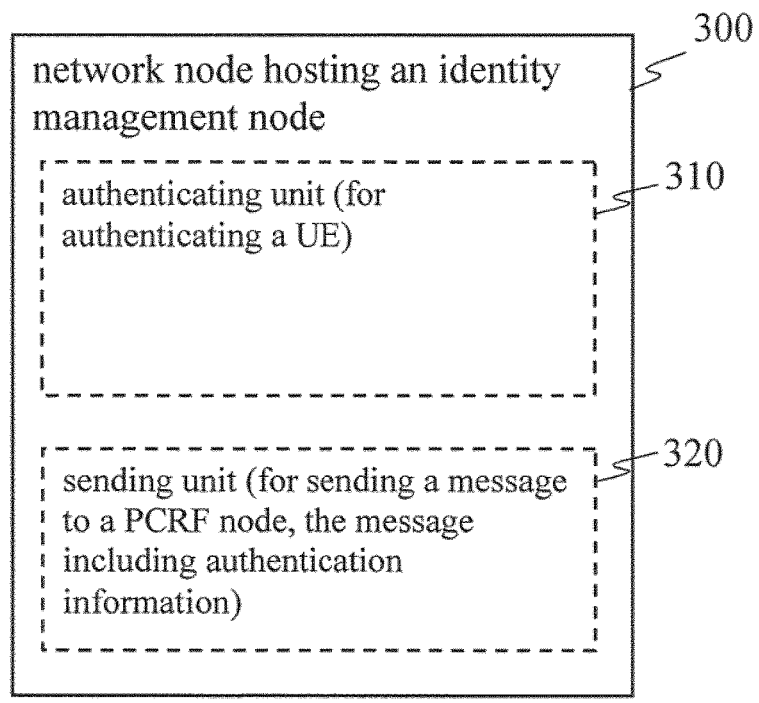
FIG. 18 schematically illustrates a network node hosting an identity management node in one embodiment of the invention.

FIG. 18 schematically illustrates a network node 300, being hereinafter referred to as "identity management node", configured for participating in providing a service in a communication network for a UE 100, in one embodiment of the invention. Identity management node 300 may for example be implemented as illustrated in FIG. 17. The identity management node 300 illustrated in FIG. 18 comprises: a first unit 310, hereinafter referred to as "authenticating unit", and a second unit 320, referred to as "sending unit". Authenticating unit 310 is configured for authenticating UE 100. Sending unit 320 is configured for sending, to a PCRF node 400, a message comprising: (a) service information for identifying the service to which access is initiated, (b) identification information for identifying UE 100, and (c) authentication information determined upon authenticating UE 100.

In one embodiment, authenticating unit 310 may be further configured for: determining that the service requires a special treatment for UE 100.

In one embodiment, sending unit 320 is further configured for sending a request, to the PCRF node 400, to indicate that the service requires the special treatment.

In one embodiment, authenticating unit 310 is further configured for: identifying, as the authentication information to be sent to PCRF node 400, at least one of a type and level of authentication that was used for authenticating UE 100.

Figure 19:
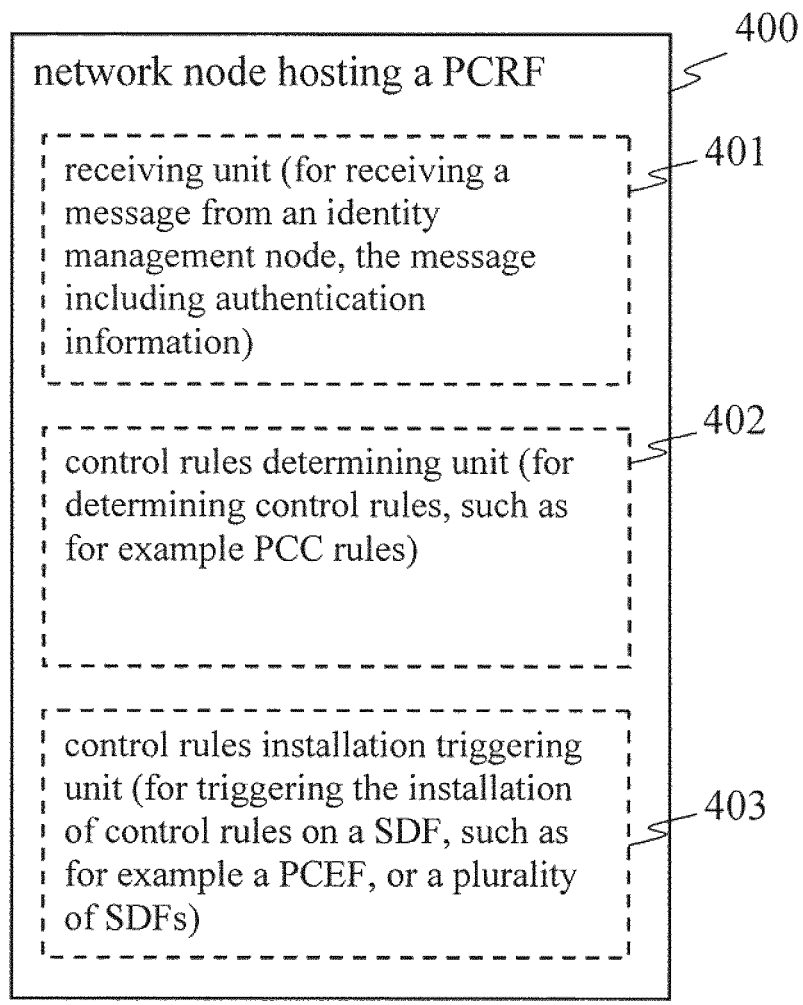
FIG. 19 schematically illustrates a network node hosting a PCRF in one embodiment of the invention.

FIG. 19 schematically illustrates a PCRF node 400 configured for participating in providing a service in a communication network, in one embodiment of the invention. PCRF node 400 may for example be implemented as illustrated in FIG. 17. The PCRF node 400 illustrated in FIG. 19 comprises: a first unit 401, referred to as "receiving unit"; a second unit 402, referred to as "control rules determining unit", and a third unit 403, referred to as "control rules installation triggering unit". Receiving unit 401 is configured for receiving, from an identity management node 300, a message comprising: (a) service information for identifying the service to which access is initiated, (b) identification information for identifying UE 100, and (c) authentication information determined upon authenticating UE 100. Control rules determining unit 402 is configured for determining control rules to be applied to the service for UE 100, wherein determining is based on the authentication information and service information. Control rules installation triggering unit 403 is configured for triggering installation of the control rules in at least one network node 500 handling SDFs for the service, said at least one network node 500 being hereinafter referred to as "SDF node(s)".

In one embodiment, receiving unit 401 is further configured for receiving a request to indicate that the service requires a special treatment. The control rules are determined for example so as to achieve, as special treatment, at least one of: (i) an acceleration of contents delivery for the service to and from UE 100; (ii) a charging type to be applied for the service; and (iii) one or more identifiers of respective applications to be detected.

In one embodiment, the authentication information received from identity management node 300 comprises at least one of a type and level of authentication that was used for authenticating UE 100.

In one embodiment, the control rules comprise at least one of: (a) PCC rules to be installed in an SDF node 500 hosting a PCEF, said SDF node 500 being hereinafter referred to as PCEF node 500; (b) ADC rules to be installed in an SDF node 500 hosting a TDF, said SDF node 500 being hereinafter referred to as TDF node 500; (c) PCC rules, which comprise ADC rules information, to be installed in an SDF node 500 hosting both PCEF and TDF, said SDF node 500 being hereinafter referred to as PCEF/TDF node 500; and (d) QoS rules to be installed in an SDF node 500 hosting a bearer binding and event reporting function (BBERF), said SDF node 500 being hereinafter referred to as BBERF node 500.

Where the terms "authenticating unit", "sending unit", "receiving unit", "control rules determining unit", "control rules installation triggering unit", etc. are used herewith, no restriction is made regarding how distributed these elements may be and regarding how gathered elements may be. That is, the constituent elements of a unit, function or network node may be distributed in different software or hardware components or devices for bringing about the intended function. A plurality of distinct elements may also be gathered for providing the intended functionalities.

Any one of the above-referred units of a network node may be implemented in hardware, software, field-programmable gate array (FPGA), application-specific integrated circuit (ASICs), firmware or the like.

In further embodiments of the invention, any one of the above-mentioned authenticating unit, sending unit, receiving unit, control rules determining unit, control rules installation triggering unit, etc. is replaced by authenticating means, sending means, receiving means, control rules determining means, control rules installation triggering means, etc. respectively, or, authenticating module, sending module, receiving module, control rules determining module, control rules installation triggering module, etc. for performing the functions of the above-mentioned authenticating unit, sending unit, receiving unit, control rules determining unit, control rules installation triggering unit, etc.

In further embodiments of the invention, any one of the above-described procedures, steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

ABBREVIATIONS

ADC Application detection and control
AF Application function
BBERF Bearer binding and event reporting function
DPI Deep packet inspection
GBA Generic bootstrapping architecture
GBR Guaranteed bit rate
IdM Identity management node
IM CN IMS Core Network
IMS IP Multimedia Subsystem
IP Internet Protocol
IP-CAN IP Connectivity Access Network
MBB Mobile broadband
MMTEL Multimedia telephony
NMS Network management system
OCS Online charging system
OFCS Offline charging system
OFS OpenFlow Switch
PCC Policy and charging control
PCEF Policy and charging enforcement function
PCRF Policy and charging rules function
P-CSCF Proxy Control Session Control Function
QCI QoS class identifier
QoE Quality of experience
QoS Quality of service
RAN Radio access network
ROM Read-only memory
SCCF Service chain control function
SDF Service data flow
SDN Software-defined networks
SDNC SDN controller
SFTP Secure File Transfer Protocol
SIM Subscriber Identity Module
SLA Service level agreement
SOAP Simple Object Access Protocol
SP Service provider
SPR Subscription profile repository
SSO Single sign on
STA Session-Termination-Answer (Diameter command)
STR Session-Termination-Request (Diameter command)
TDF Traffic detection function
UE User equipment
VoD Video on demand

The invention claimed is:

1. A method for providing a service in a communication network, the method comprising:
   initiating an access, by a user equipment, to the service requiring authentication;
   authenticating, by a network node, being hereinafter referred to as "identity management node", the user equipment and, as part of the authentication, determining that the service requires a special treatment for the user equipment;
   sending, by the identity management node, to a network node hosting a policy and charging rules function, said network node being hereinafter referred to as "PCRF node", a message comprising:
   service information for identifying the service to which access is initiated,
   a request to indicate that the service requires the special treatment,
   identification information for identifying the user equipment, and
   authentication information determined upon authenticating the user equipment, the authentication information comprising a level of authentication used for authenticating the user equipment;
   determining, by the PCRF node, control rules to be applied to the service for the user equipment, wherein determining is based on the level of authentication used for authenticating the UE and the service information identifying the service requiring the special treatment, and wherein the control rules are determined to achieve the special treatment, the special treatment comprising at least an acceleration of contents delivery for the service to and from the user equipment;
   triggering, by the PCRF node, installation of the control rules in at least one network node handling service data flows, hereinafter abbreviated as "SDF", for the service, said at least one network node being hereinafter referred to as "SDF node(s)"; and
   enforcing, by the SDF node(s), the control rules on traffic associated with the service provided to the user equipment.

2. The method of claim 1, wherein the control rules are determined so as to achieve, as special treatment, at least one of:
   a charging type to be applied for the service; and
   one or more identifiers of respective applications to be detected.

3. The method of claim 1, wherein initiating the access to the service comprises:
   receiving a service access request at a service entity; and
   sending from the service entity to the identity management node, an authentication request for the user equipment.

4. The method of claim 1, wherein authenticating the user equipment, by the identity management node, comprises identifying, as the authentication information to be sent to the PCRF node, a type and the level of authentication used for authenticating the user equipment.

5. The method of claim 1, wherein the control rules comprise at least one of:
- policy and charging control rules, hereinafter referred to as PCC rules, to be installed in an SDF node hosting a policy and charging enforcement function, said SDF node being hereinafter referred to as PCEF node;
- application detection and control rules, hereinafter referred to as ADC rules, to be installed in an SDF node hosting a traffic detection function, said SDF node being hereinafter referred to as TDF node;
- PCC rules, which comprise ADC rules information, to be installed in an SDF node hosting both policy and charging enforcement function and traffic detection function, said SDF node being hereinafter referred to as PCEF/TDF node; and
- quality of service rules, hereinafter referred to as QoS rules, to be installed in an SDF node hosting a bearer binding and event reporting function, said SDF node being hereinafter referred to as BBERF node.

6. A method, carried out by a network node, the network node being hereinafter referred to as "identity management node", for participating in providing a service in a communication network for a user equipment, the method comprising:
- authenticating the user equipment and, as part of the authentication, determining that the service requires special treatment for the user equipment, the special treatment comprising at least an acceleration of contents delivery for the service to and from the user equipment; and
- sending, to a network node hosting a policy and charging rules function, said network node being hereinafter referred to as "PCRF node", a message comprising:
  - service information for identifying the service to which access is initiated,
  - a request to indicate that the service requires the special treatment,
  - identification information for identifying the user equipment, and
  - authentication information determined upon authenticating the user equipment, the authentication information comprising a level of authentication used for authenticating the user equipment, the level of authentication used for determining control rules for achieving the special treatment.

7. The method of claim 6, wherein authenticating the user equipment comprises identifying, as the authentication information to be sent to the PCRF node, at least one of a type and the level of authentication used for authenticating the user equipment.

8. A method carried out by a network node hosting a policy and charging rules function, said network node being hereinafter referred to as "PCRF node", for participating in providing a service in a communication network, the method comprising:
- receiving, from a network node, being hereinafter referred to as "identity management node", a message comprising:
  - service information for identifying the service to which access is initiated,
  - a request to indicate that the service requires a special treatment,
  - identification information for identifying the user equipment, and
  - authentication information determined upon authenticating the user equipment, the authentication information comprising a level of authentication used for authenticating the user equipment;
- determining control rules to be applied to the service for the user equipment, wherein determining is based on the level of authentication used for authenticating the UE and the service information identifying the service requiring the special treatment, and wherein the control rules are determined to achieve the special treatment, the special treatment comprising at least an acceleration of contents delivery for the service to and from the user equipment; and
- triggering installation of the control rules in at least one network node handling service data flows, hereinafter abbreviated as SDF, for the service, said at least one network node being hereinafter referred to as "SDF node(s)".

9. The method of claim 8, wherein the control rules are determined so as to achieve, as special treatment, at least one of:
- a charging type to be applied for the service; and
- one or more identifiers of respective applications to be detected.

10. The method of claim 8, wherein the authentication information received from the identity management node comprises a type of authentication that was used for authenticating the user equipment.

11. The method of claim 8, wherein determining the control rules comprises identifying a policy action, associated with the received authentication information and service information, and mapping the policy action to one or more control rules to be applied.

12. The method of claim 8, wherein the control rules comprise at least one of:
- policy and charging control rules, hereinafter referred to as PCC rules, to be installed in an SDF node hosting a policy and charging enforcement function, said SDF node being hereinafter referred to as PCEF node;
- application detection and control rules, hereinafter referred to as ADC rules, to be installed in an SDF node hosting a traffic detection function, said SDF node being hereinafter referred to as TDF node;
- PCC rules, which comprise ADC rules information, to be installed in an SDF node hosting both policy and charging enforcement function and traffic detection function, said SDF node being hereinafter referred to as PCEF/TDF node; and
- quality of service rules, hereinafter referred to as QoS rules, to be installed in an SDF node hosting a bearer binding and event reporting function, said SDF node being hereinafter referred to as BBERF node.

13. A network node, being hereinafter referred to as "identity management node", configured for participating in providing a service in a communication network for a user equipment, the identity management node comprising:
- memory storing instructions; and
- a processor operable to execute the instructions to cause the identity management node to:
  - authenticate the user equipment and, as part of the authentication, for determining that the service requires a special treatment for the user equipment, the special treatment comprising at least an acceleration of contents delivery for the service to and from the user equipment; and send, to a network node hosting a policy and charging rules function, said network node being hereinafter referred to as "PCRF node", a message comprising:
service information for identifying the service to which access is initiated,
a request to indicate that the service requires the special treatment,
identification information for identifying the user equipment, and
authentication information determined upon authenticating the user equipment, the authentication information comprising a level of authentication used for authenticating the user equipment, the level of authentication used for determining control rules for achieving the special treatment.

14. The identity management node of claim 13, wherein the authentication information sent to the PCRF node comprises a type of authentication used for authenticating the user equipment.

15. A network node hosting a policy and charging rules function, said network node being hereinafter referred to as "PCRF node", configured for participating in providing a service in a communication network, the PCRF node comprising:
memory storing instructions; and
a processor operable to execute the instructions to cause the PCRF node to:
receive, from a network node, being hereinafter referred to as "identity management node", a message comprising:
service information for identifying the service to which access is initiated,
a request to indicate that the service requires a special treatment,
identification information for identifying the user equipment, and
authentication information determined upon authenticating the user equipment, the authentication information comprising a level of authentication used for authenticating the user equipment;
determine control rules to be applied to the service for the user equipment, wherein determining is based on the level of authentication used for authenticating the UE and the service information identifying the service requiring the special treatment, and wherein the control rules are determined to achieve the special treatment, the special treatment comprising at least an acceleration of contents delivery for the service to and from the user equipment; and
trigger installation of the control rules in at least one network node handling service data flows, hereinafter abbreviated as SDF, for the service, said at least one network node being hereinafter referred to as "SDF node(s)".

16. The PCRF node of claim 15, wherein the processor is operable to execute the instructions to cause the PCRF node to receive a request, from the identity management node, to indicate that the service requires a special treatment.

17. The PCRF node of claim 16, wherein the control rules are determined so as to achieve, as special treatment, at least one of:
a charging type to be applied for the service; and
one or more identifiers of respective applications to be detected.

18. The PCRF node of claim 15, wherein the authentication information received from the identity management node comprises a type of authentication that was used for authenticating the user equipment.

19. The PCRF node of claim 15, wherein the processor is operable to execute the instructions to cause the PCRF node to identify a policy action, associated with the received authentication information and service information, and map the policy action to one or more control rules to be applied.

20. The PCRF node of claim 15, wherein the control rules comprise at least one of:
policy and charging control rules, hereinafter referred to as PCC rules, to be installed in an SDF node hosting a policy and charging enforcement function, said SDF node being hereinafter referred to as "PCEF node";
application detection and control rules, hereinafter referred to as ADC rules, to be installed in an SDF node hosting a traffic detection function, said SDF node being hereinafter referred to as "TDF node";
PCC rules, which comprise ADC rules information, to be installed in an SDF node hosting both policy and charging enforcement function and traffic detection function, said SDF node being hereinafter referred to as "PCEF/TDF node"; and
quality of service rules, hereinafter referred to as QoS rules, to be installed in an SDF node hosting a bearer binding and event reporting function, said SDF node being hereinafter referred to as "BBERF node".

* * * * *